US009442213B2

(12) United States Patent
Bendahan et al.

(10) Patent No.: US 9,442,213 B2
(45) Date of Patent: Sep. 13, 2016

(54) METHOD OF ELECTRON BEAM TRANSPORT IN AN X-RAY SCANNER

(71) Applicant: Rapiscan Systems, Inc., Torrance, CA (US)

(72) Inventors: Joseph Bendahan, San Jose, CA (US); James Kevin Jones, Stockton Heath (GB); Deepa Angal-Kalinin, Appleton (GB); Kiril Borisov Marinov, Warrington (GB)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 14/270,874

(22) Filed: May 6, 2014

(65) Prior Publication Data

US 2015/0014526 A1 Jan. 15, 2015

Related U.S. Application Data

(63) Continuation-in-part of application No. 13/009,765, filed on Jan. 19, 2011, now Pat. No. 9,086,497.

(60) Provisional application No. 61/820,105, filed on May 6, 2013, provisional application No. 61/296,080, filed on Jan. 19, 2010.

(51) Int. Cl.
*G01V 5/00* (2006.01)
*G01T 3/00* (2006.01)

(52) U.S. Cl.
CPC .............. *G01V 5/005* (2013.01); *G01T 3/00* (2013.01)

(58) Field of Classification Search
USPC ........................ 250/307, 442.11; 378/5, 20
See application file for complete search history.

(56) References Cited

U.S. PATENT DOCUMENTS 4,352,021 A * 9/1982 Boyd .................... A61B 6/032
378/10
4,658,408 A 4/1987 Amor
(Continued)

FOREIGN PATENT DOCUMENTS

EP 1875866 1/2008
WO 2010141101 12/2010
(Continued)

OTHER PUBLICATIONS

International Search Report for PCT/US11/21758; Jul. 7, 2011, Rapiscan Systems Inc.
(Continued)

*Primary Examiner* — Phillip A Johnston
*Assistant Examiner* — Hsien Tsai
(74) *Attorney, Agent, or Firm* — Novel IP

(57) ABSTRACT

The present invention provides a multi-view X-ray inspection system. In one embodiment, a beam steering mechanism directs the electron beam from an X-ray source to multiple production targets which generate X-rays for scanning which are subsequently detected by a plurality of detectors to produce multiple image slices (views). The system is adapted for use in CT systems. In one embodiment of a CT system, an electron beam generated by a single radiation source is steered by an electron beam transport mechanism comprising at least two dipoles and a quadrupole on to a target arranged in an approximated arc. The inspection system, in any configuration, can be deployed inside a vehicle for use as a mobile detection system.

23 Claims, 18 Drawing Sheets

(56) References Cited

U.S. PATENT DOCUMENTS

| | | |
|---|---|---|
| 5,065,418 A | 11/1991 | Bermbach |
| 5,091,924 A | 2/1992 | Bermbach |
| 5,197,088 A | 3/1993 | Vincent |
| 5,259,012 A * | 11/1993 | Baker et al. .................. 378/21 |
| 5,491,734 A | 2/1996 | Boyd |
| 5,504,791 A * | 4/1996 | Hell .................. A61B 6/032 378/10 |
| 5,508,515 A * | 4/1996 | Enge ........................ 250/281 |
| 5,818,054 A | 10/1998 | Randers-Pehrson |
| 7,233,644 B1 | 6/2007 | Bendahan |
| 2002/0094064 A1 | 7/2002 | Zhou |
| 2004/0081269 A1 | 4/2004 | Pan |
| 2004/0109532 A1 | 6/2004 | Ford |
| 2005/0053185 A1 | 3/2005 | Sukovic |
| 2005/0117694 A1 | 6/2005 | Francke |
| 2005/0226364 A1 | 10/2005 | Bernard |
| 2007/0237293 A1 | 10/2007 | Singh |
| 2008/0043910 A1 | 2/2008 | Thomas |
| 2008/0137805 A1 | 6/2008 | Forster |
| 2008/0304622 A1 | 12/2008 | Morton |
| 2010/0111260 A1 | 5/2010 | Motz |
| 2010/0127169 A1 * | 5/2010 | Whittum .............. G01V 5/0041 250/306 |
| 2011/0103554 A1 * | 5/2011 | Charette .............. G01V 5/0041 378/138 |
| 2011/0206179 A1 | 8/2011 | Bendahan |
| 2012/0321049 A1 | 12/2012 | Langeveld |

FOREIGN PATENT DOCUMENTS

| | | |
|---|---|---|
| WO | 2011091070 A2 | 7/2011 |
| WO | 2014182685 A1 | 11/2014 |

OTHER PUBLICATIONS

Written Opinion on Patentability for PCT/US11/21758; Jul. 7, 2011; Rapiscan Systems.

Notice of Allowance dated Mar. 16, 2015 for U.S. Appl. No. 13/009,765.

International Preliminary Report on Patentability for PCT/US11/21758, Jul. 7, 2011.

Examination Report for GB1212495.4, Rapiscan Systems Inc., dated Aug. 11, 2014.

Search and Exam Report for GB1422312.7, dated Jan. 7, 2015, Rapiscan Systems, Inc.

Exam Report for GB1422312.7, dated Apr. 9, 2015.

International Search Report for PCT/US14/36952, Sep. 12, 2014.

Written Opinion of the International Searching Authority for PCT/US14/36952, Sep. 12, 2014.

* cited by examiner

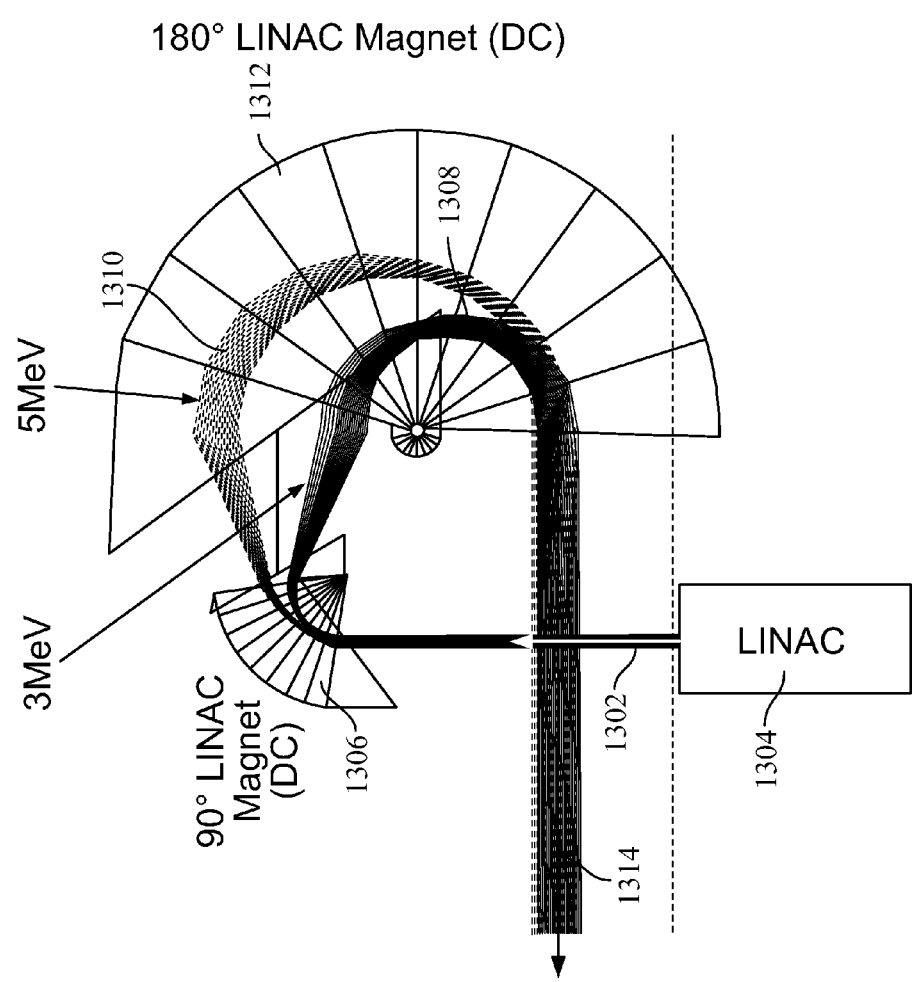

METHOD OF ELECTRON BEAM TRANSPORT IN AN X-RAY SCANNER

CROSS-REFERENCE TO RELATED APPLICATIONS

The present specification relies on U.S. Provisional Patent Application No. 61/820,105, entitled "Method of Electron Beam Transport In An X-Ray Scanner" and filed on May 6, 2013, for priority.

The present specification is also a continuation-in-part of U.S. patent application Ser. No. 13/009,765, entitled "Multi-View Cargo Scanner", and filed on Jan. 19, 2011, which relies on U.S. Provisional Patent Application No. 61/296,080, of the same title, and filed on Jan. 19, 2010, for priority, both of which are herein incorporated by reference in their entirety.

FIELD

The present invention is directed to multi-view, high-energy cargo scanners and, more specifically, methods and systems of cost-effectively increasing the number of scanning views of an object or dense cargo under inspection, which has application, for example, in improving estimations of the density and atomic number of the cargo contents for enhanced detection of contraband and other materials of interest.

BACKGROUND

Cargo containers need to be inspected at airports, seaports and other points of entry for transportation of contraband such as explosives, narcotics, currency, chemical and nuclear weapons, and for cargo-manifest verification. Detection of contraband with both high detection rates and low false alarm rates is a daunting task, as these materials often have similar physical characteristics as benign cargo. The percentage of cargo to be inspected is increasing and, because of the currently manually intensive nature of inspections, so is the number of operators. Therefore, there is a need to provide an automatic detection system to reduce the number of operators, or, at least, provide assistance tools that help operators improve their throughput by scrutinizing the cargo images more efficiently, thereby increasing detection and analysis speed.

Standard and advanced X-ray systems have difficulty detecting contraband in break-bulk cargo. This difficulty is exacerbated when inspecting larger and/or cluttered pallets and cargo containers.

Computed Tomography (CT)-based systems have been shown to be more suitable for the difficult task of detecting aviation-threat explosives in luggage and, more recently, in larger objects. However, existing high-energy CT systems for large objects are configured horizontally (horizontal gantry) with the object rotating around its axis. In one case, the source and detectors move vertically, and in the other case, the object moves vertically while the source and detectors are stationary. In both cases, the length of the scanned objects is limited by the system size and the configuration prevents scaling the system up to long objects such as large cargo containers and large skids.

U.S. Pat. No. 4,352,021, to the Regents of the University of California, describes "an x-ray transmission scanning system an electron beam scan tube for providing a plurality of adjacent movable x-ray sources comprising: an evacuated envelope having a longitudinal axis; an electron gun disposed axially at one end of the envelope projecting an electron beam along said axis; a focus coil spaced from said gun to receive and focus said beam; a plurality of adjacent longitudinally spaced curvilinear elongated targets disposed at the other end of said envelope to receive the electron beam and generate x-rays in response thereto; means for moving said focused electron beam along said targets and from one target to another; and a source collimator having an elongated slot disposed adjacent to each of said elongated targets to intercept said x-rays and provide an x-ray beam which fans outwardly from the received electron beam to form a fan shaped beam which rotates as the electron beam is moved along the corresponding target whereby to scan a plurality of adjacent longitudinally spaced sections at least one for each of said targets."

In addition, U.S. Pat. No. 7,233,644, assigned to GE Homeland Protection, Inc. describes "[a] CT scanner for scanning an object by projecting x-ray fans from source points located along a source path to generate multiple views of the object, the CT scanner comprising a plurality of rastered x-ray tubes located in fixed positions in one or more scan planes, each rastered x-ray tube characterized by a raster path and capable of producing x-ray fans projected from different points along the raster path, wherein substantially all of the source points along the source path of the CT scanner are located on at least one of the raster paths of the x-ray tubes, wherein each x-ray tube is positioned such that the raster paths of adjacent x-ray tubes are substantially continuous."

Large cargo containers require a relatively higher energy to be efficiently and effectively scanned for threat items. At the higher energy required, however, these approaches are not suitable for implementation due to cost, size, and complexity. Thus, the design and method of current detection systems limits the depth of information that can be obtained from scanned objects. Enhanced depth information typically requires a plurality of sources.

Therefore, there is a need for detection systems which are flexible and can scan objects of various sizes, while providing both depth information and images of high resolution that use a minimum amount of sources.

There is also a need for scanning systems that work on reduced cost, power consumption and machine size.

SUMMARY

According to one aspect of the invention there is provided an inspection system for generating a plurality of scanning views of an object under inspection, comprising: a source for generating at least one high-energy electron beam; a first set of magnets for directing the at least one electron beam into an electron beam transport system, the electron beam transport system comprising a plurality of steering and focusing devices, for directing said at least one electron beam to at least one target, wherein said at least one target is arranged to produce radiation beams for scanning the object; at least one second set of magnets to maintain the at least one electron beam in a desired trajectory; at least one detector array for detecting said radiation; a transport mechanism to move the object through the system; and a processor for reconstructing tomographic images.

Instead of electrons, other charged particles may be used, for example where the produced radiation comprises neutrons.

The source may be a linear accelerator (linac) or any other source of high-energy electrons.

The source may be arranged to produce two high energy electron beams in an interlaced mode, wherein the energy of a first energy electron beam is lower than the energy of a second electron beam.

The source may be pulsed, for example with a pulsing frequency of 500 Hz.

The first set of magnets may be used in combination with slits or other collimating means to filter out low energy electron components.

The first set of magnets may comprise two magnets for turning the interlaced beams at different angles such that they end up on the same trajectory.

The electron beam transport system may comprise at least one electron beam transport station, or a plurality of electron beam transport stations, each station comprising: a first pulsed magnet to extract electrons from the beam and a second magnet for bringing electrons having different energies from the first magnet onto the same trajectory. The sum of the angles of the magnets, i.e. the angles through which they are arranged to turn the beam, may be approximately 270 degrees. For example the first magnet may have an angle of about 90 degrees and the second magnet may have an angle of about 180 degrees. Each beam transport station may further comprise a set of focusing magnets to focus the electron beam, for example comprising two quadrupoles to focus the beam in two orthogonal directions on the target to achieve the desired focal-spot size.

The, or each, electron transport station may comprise a steering magnet, which may be between the second magnet and the target, for steering an electron beam into multiple positions on the target.

The at least one second set of magnets may be arranged between two of the beam transport stations, or between each pair of adjacent transport stations to maintain a specific primary beam trajectory.

The second set of magnets may comprise an achromat that includes two dipoles and one quadrupole.

According to a further aspect of the invention there is provided an inspection system for generating a plurality of scanning views of an object under inspection, comprising: a radiation source for generating a high-energy electron beam from a radiation source; a first magnet for directing the interlaced electron beams into an electron beam transport system; directing said electron beam within said electron beam transport system to a corresponding at least one production targets for generating radiation beams for scanning the object; at least one detector array for detecting said radiation beams to produce a corresponding plurality of scanning views; a transport mechanism to move the object through the system; and a processor for reconstructing tomographic images.

The tomographic images may include atomic number information.

The electron beam transport system may comprise at least one electron beam transport station, each station comprising: a first dipole magnet to extract electrons from the beam and a second dipole magnet for bringing electrons having different energies from the first magnet onto the same trajectory. The sum of the angles of the magnets may be approximately 90 degrees, for example the first magnet may have an angle of approximately 45 degrees and the second magnet may have an angle of approximately 45 degrees. Each station may further comprise a quadrupole magnet placed symmetrically between the first and second dipole magnets. Each station may further comprise two quadrupoles to focus the beam, for example in orthogonal directions, on the target, to achieve the desired focal-spot size.

The at least one production target may comprise an extended target for a plurality, or all, of the electron beam transport stations, or a separate target for each electron beam transport station.

The system may be arranged to generate a second high energy radiation beam after a first scan process by changing a magnetic parameter of the system to enable a dual-energy scan.

The first magnet is used in combination with slits to filter out low energy electron components.

According to a further aspect of the invention there is provided an inspection system for generating a plurality of scanning views of an object under inspection, comprising: a source for generating at least one beam of charged particles; an beam steering system comprising a plurality of steering and focusing devices, for directing said charged particles to a plurality of locations along at least one target, said at least one target generating a plurality of neutron beams for scanning the object; at least one neutron detector array for detecting said neutron beams; a transport mechanism to move the object through the system; and a processor for reconstructing tomographic images from data obtained from the at least one detector array.

The charged particles may be low-energy deuterons, for example 300 kV or lower, and the at least one target may be tritium-based. Alternatively particles may be high-energy deuterons, for example approximately 3 MeV or higher, and the at least one target may be deuterium- or beryllium-based. Alternatively the particles may be protons, and the at least one target may be lithium.

The targets may be positioned along an arcuate path. The path may extend around the scanning volume, which is the volume that the scanner is arranged to image, and through which the object is transported.

According to a further aspect of the invention there is provided an inspection method for generating a plurality of scanning views of an object under inspection, comprising: generating two interlaced high-energy electron beams, using a radiation source; directing the interlaced electron beams into an electron beam transport system, using a first set of magnets; directing said electron beams to a plurality of production targets using an electron beam transport system comprising a plurality of steering and focusing devices; maintaining the electron beam in a desired trajectory, using a second set of magnets; and detecting said radiation, using at least one detector array.

The production targets may generate radiation beams for scanning the object. A transport mechanism may be used to move the object through the system. A processor may be employed to collect data from said at least one detector array and reconstruct tomographic images using said data. The tomographic images may include atomic number information.

According to a further aspect of the invention there is provided an inspection method for generating a plurality of scanning views of an object under inspection, comprising: generating at least one charged particle beam; directing the beam, using a first set of beam-conditioning elements to a charged-beam transport system; directing said beams to a radiation-producing target using an charged beam transport system comprising a plurality of steering and focusing devices; maintaining the beam in a desired trajectory, using a second set of beam conditioning elements; and detecting said radiation, using at least one radiation detector array.

The particle beam may be single energy or multi-energy interlaced. The produced radiation may be x-rays or neutrons. The charged particles may be electrons, protons, or deuterons.

The radiation target may be tungsten, deuterium, tritium, lithium or beryllium.

The production targets may generate radiation beams for scanning the object. A transport mechanism may be used to move the object through the system. A processor may be employed to collect data from said at least one detector array and reconstruct tomographic images using said data. The tomographic images may include atomic number information. The images may be inspected to determine the presence of contraband within the object.

According to a further aspect of the present invention, there is provided an inspection method for generating a plurality of scanning views of an object under inspection, comprising: generating at least one high-energy charged particle beam, such as an electron beam, from a charged particle, or electron, source; directing the particle beam into a particle beam transport system; directing said particle beam within said particle beam transport system to a corresponding plurality of production targets; generating radiation beams for scanning an object; detecting said radiation to produce a corresponding plurality of scanning views; moving the object under inspection through the system; generating at least one image from said plurality of scanning views; and reconstructing said generated images.

An analyzing magnet may be employed to direct the electron beam into the particle transport system. Further, the analyzing magnet may comprise a 90 degree DC and a 180 degree DC magnet.

The electron transport station may comprise a 90 degree pulsed target magnet and a 180 degree DC target magnet.

The production targets may be employed to generate radiation beams for scanning an object.

The radiation may be detected using at least one detector array.

A transport mechanism may be employed to move the object under inspection through the system.

The electron beam may be spread onto multiple positions on a target.

According to a further aspect of the invention there is provided an inspection system for generating a plurality of scanning views of an object under inspection, comprising: a source for generating two high-energy electron beams; an analyzing magnet for directing the electron beam into an electron beam transport station; at least one magnetic element, such as but not limited to an achromat to maintain the electron beam in a desired trajectory; an electron beam transport station for directing said electron beam to a corresponding plurality of production targets, said production targets generating radiation beams for scanning an object; a plurality of detector arrays that detect said radiation to produce a corresponding plurality of scanning views; and a transport mechanism to move the object under inspection through the system.

The electron beam transport station may comprise at least one target magnet and at least one quadrupole for directing said electron beam to a plurality of production targets. Further, the electron beam transport station may comprise a steering magnet for steering the electron beam onto multiple positions on a target.

The at least one target magnet may comprise a 90 degree pulsed target magnet and a 180 degree DC target magnet.

The analyzing magnet may comprise a 90 degree DC and a 180 degree DC magnet.

According to one aspect of the invention there is provided an inspection system for generating a plurality of scanning views of an object under inspection, comprising: a source for generating at least one electron beam, which may be a high energy electron beam, having a range of 1 MeV to 15 MeV; an analyzing magnet for directing the electron beam into an electron beam transport station; at least one magnetic element to maintain the electron beam in a desired trajectory; the electron beam transport station comprising a plurality of steering and focusing devices, for directing said electron beam to a corresponding plurality of production targets, said production targets generating radiation beams for scanning an object; a plurality of detector arrays that detect said radiation to produce a corresponding plurality of scanning views; a transport mechanism to move the object under inspection through the system; and a processor for reconstructing images. The source may be a linac which is arranged to generate at least two electron beams, each of which may be a high energy electron beam. For example both beams may have energies of at least 1 MeV, and the difference between the energies of the beams may be at least 1 MeV. A first energy may be on the order of 3 MeV while the second energy may be on the order of 5 MeV. In other configurations, the first energy may be on the order of 6 MeV while the second energy may be on the order of 9 MeV.

The analyzing magnet and collimators may be used to filter out low energy electron components. Further, the analyzing magnet may comprise a 90 degree DC and a 180 degree DC magnet.

The electron transport station may comprise a 90 degree pulsed target magnet and a 180 degree DC target magnet. Further, the electron transport station may comprise a steering magnet for steering an electron beam into multiple positions on a target.

The system or method may further comprise, in any combination, any one or more features of the embodiments of the present invention which shall now be described in greater depth by way of example only in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 13 illustrates a method of transporting a dual-energy, high-energy electron beam from a linear accelerator and removing the low energy beam tail before entering into an EBT system, in accordance with an embodiment of the present invention, as shown in FIG. 11;

DETAILED DESCRIPTION

Figure 1:
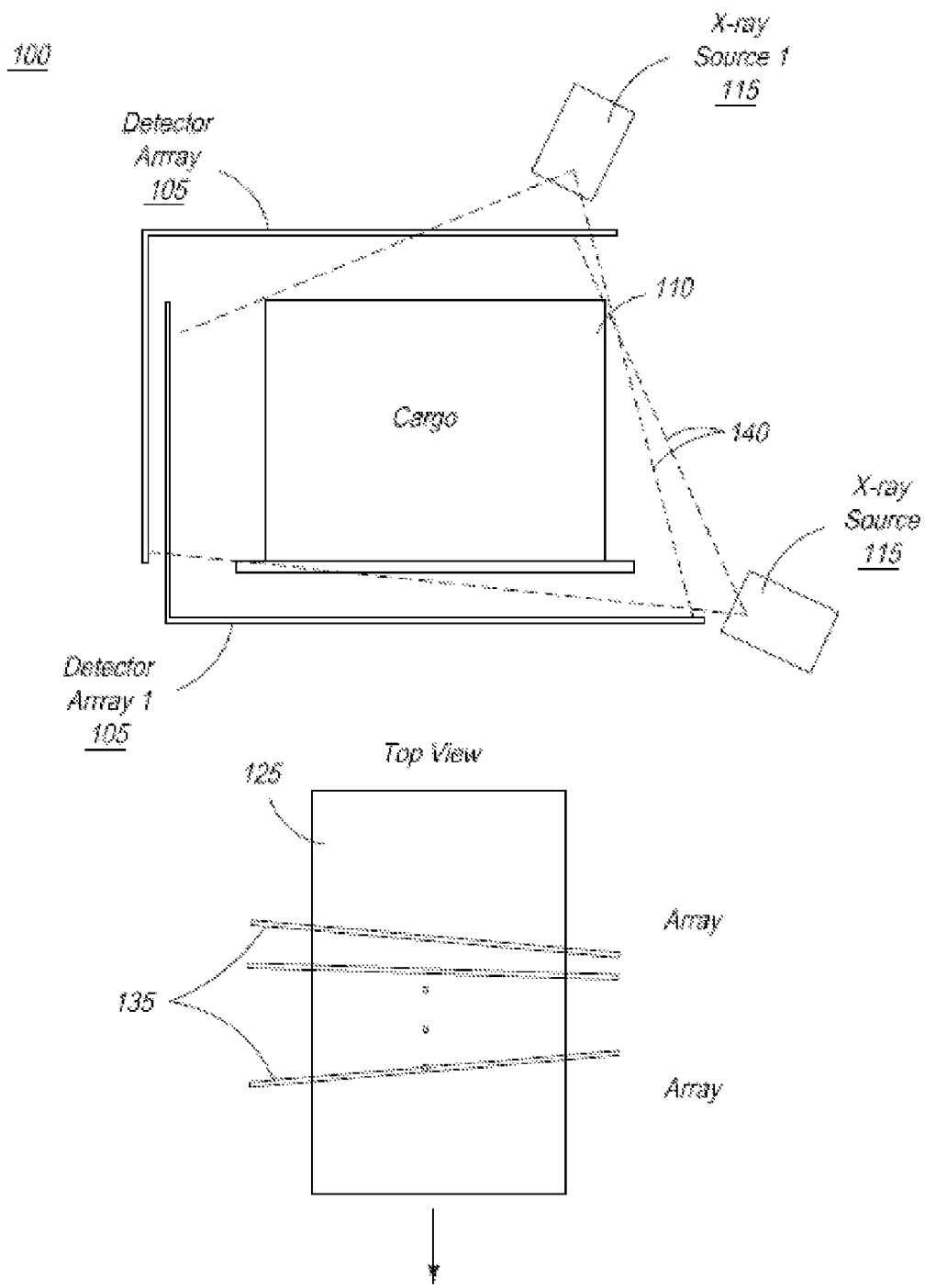
FIG. 1 shows a high energy X-ray system with at least two X-ray sources.

The present invention is directed towards methods and systems for obtaining multiple high-energy scanning views of an object or cargo under inspection, which may be used for improving estimations of the density and atomic number of the cargo contents for enhanced detection of contraband and other materials of interest. In addition, the present invention is directed towards methods and systems for obtaining multiple scanning views of an object or cargo under inspection without using additional sources or detector arrangements.

In one embodiment, the present invention is directed toward an X-ray system comprising electron optics and/or beam transport systems that enable a single, multi-energy megavoltage electron source to be implemented with multiple X-ray production targets, to yield a plurality of views. The leveraging of a single source capable of producing multiple energies with multiple X-ray production targets to yield multiple views reduces cost, power consumption, and machine size.

The present specification is directed towards the use of radiation generated by a charged particle when impinging on a target, wherein the radiation is directed toward cargo using a beam steering mechanism and at least one associated radiation production target. The present specification describes systems and methods for using a radiation source, such as a linear accelerator (linac) for producing an electron beam, and electromagnetically steering or transporting electrons towards a target. In some alternate embodiments, low-energy deuterons can be employed to impinge upon a tritium target to implement neutron tomography. In other alternate embodiments, high-energy deuterons can be accelerated toward a deuterium or beryllium target. Other reactions may include protons on lithium.

In one embodiment, the source is an electron source, such as a linear accelerator (linac) that is used to produce an electron beam. While the present invention is described with respect to use of a linac as the source, it should be understood that a number of other charged particle sources can be used, for example, but not limited to such example, a source for generating charged particles, such as deuterons. Thus, optionally, a particle accelerator can be employed. If a particle accelerator is employed, the targets consist of neutron production materials (e.g. tritium or deuterium) to produce neutrons.

In addition, when implemented in a CT system, a single source capable of producing multiple energies and used in conjunction with multiple X-ray production targets yields both multiple views and higher effective rotational frequencies that are generally difficult to implement with a mechanical gantry.

In an embodiment, a CT implementation of the present invention is applied to scanning large objects. The system produces high-resolution, three-dimensional (3D) density and approximate atomic number (Z) images of cargo without reduced interposition typical of radiographic images. These properties facilitate the identification of the type of cargo and allow for detection of different materials concealed within cargo.

In another embodiment, the present invention is directed towards a CT system that advantageously employs one source and does not require mechanical rotation. Thus, the rotation is achieved electronically rather than mechanically by rastering an electron beam generated from a high-energy source of electrons along an approximated arc using a combination of magnets, dipoles, and quadrupoles. The electron beam is directed (transported) toward at least one X-ray production target to produce a rotating X-ray beam (stationary gantry), while the object is translated at a constant speed.

All the above mentioned embodiments can be used in different configurations such as in a fixed site, gantry, or mobile configurations, further including a conveyor mechanism or other transport mechanism.

In various embodiments, the system includes a processor, such as a computer or microprocessor that will accept signals generated from all views and combine the data to produce tomographic images. The computer can have a graphical processor unit (GPU) to speed up the reconstruction.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Referring to FIG. 1, an X-ray system 100 according to one embodiment of the invention is shown. The system generates at least one and preferably a plurality of views by deploying at least two X-ray sources 115 around the cargo 110 to be scanned. A typical configuration includes one source and one detector array, generally. Some systems use two sources with a detector array placed on each side. Finally, the multiple views can also be generated by multiple detector arrays "driven" by a single source, where the arrays are close and have a smaller angle. Radiation 140 from the X-ray sources is detected by a plurality of detector arrays 105. A top view 125 shows a plurality of slices, or views N, 135, corresponding to the at least two X-ray sources.

Figure 2A:
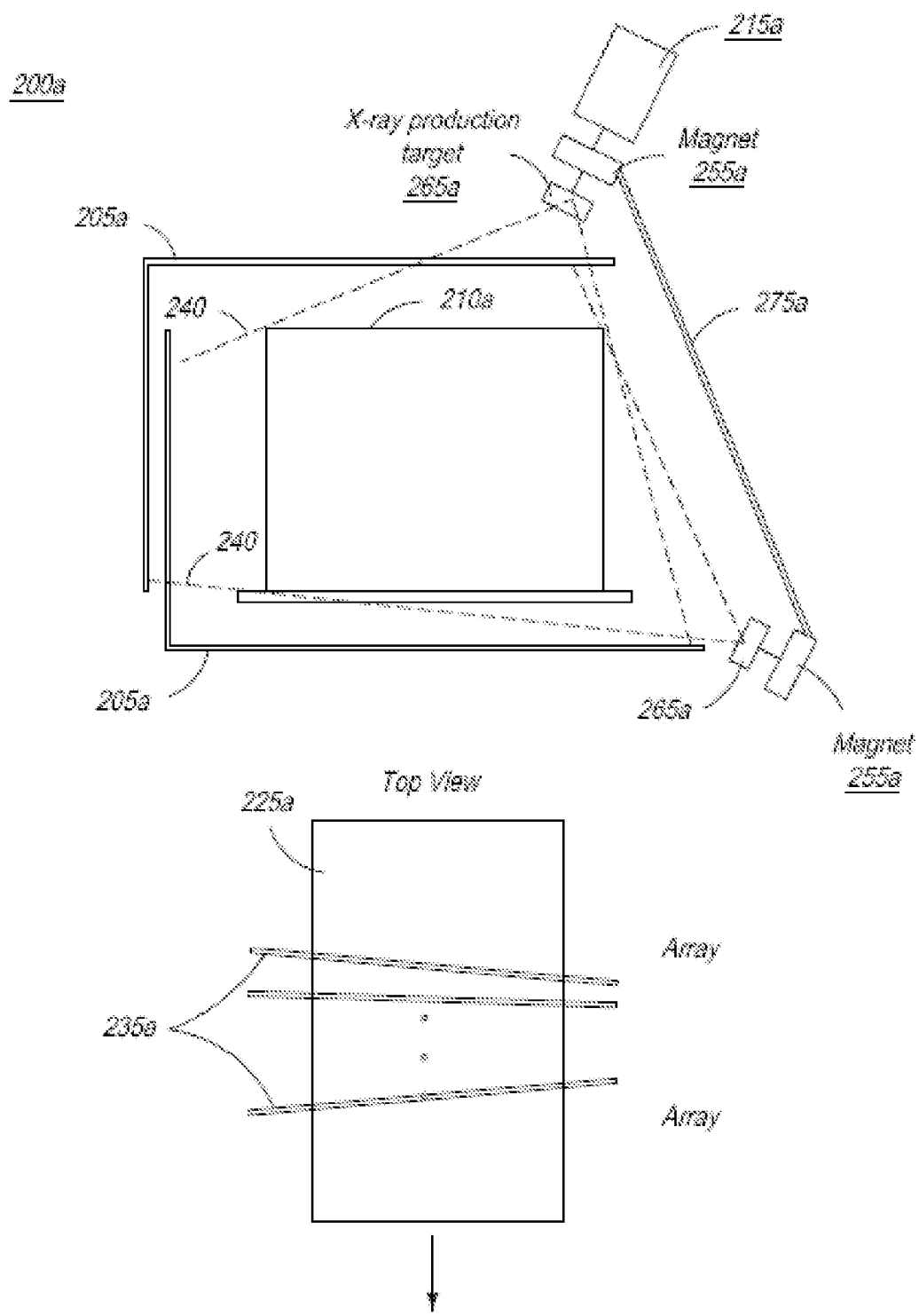
FIG. 2A shows one embodiment of the present invention employing a plurality of X-ray production targets using less than N X-ray sources to generate N multiple views.

As shown in FIG. 2A, the multi-view X-ray scanning system of FIG. 1 can be modified with electron-beam optics that transport electrons to multiple X-ray production targets to yield a larger number of views without increasing the number of sources. It should be understood by those of ordinary skill in the art that any X-ray production target may be used as long as it achieves the purpose of the present invention. In one embodiment, the X-ray production target comprises tungsten backed with water-cooled copper. Referring to FIG. 2A, the X-ray system 200a employs a single electron source 215a that emits electrons toward a charged particle steering system, and in one embodiment, an electron beam steering system comprising at least one magnet 255a. In one embodiment, electron beam steering system comprises one magnet, but preferably it comprises a plurality of distributed magnets. The at least one magnet 255a redirects the electrons toward a plurality of corresponding X-ray production targets 265a.

X-ray system 200a generates N views by deploying fewer than N sources, in this case single electron source 215a, whose emissions are directed to a plurality M of X-ray production targets 265a using at least one steering system 275a. The plurality of X-ray production targets 265a generates radiation beams 240, which scan an object 210a and are detected by a plurality of detector arrays 205a. It should be noted herein that the detectors may comprise a multi-slice detector arrangement. A top view 225a shows the plurality of slices or views N, 235a, corresponding to X-ray production targets 265a.

Figure 2B:
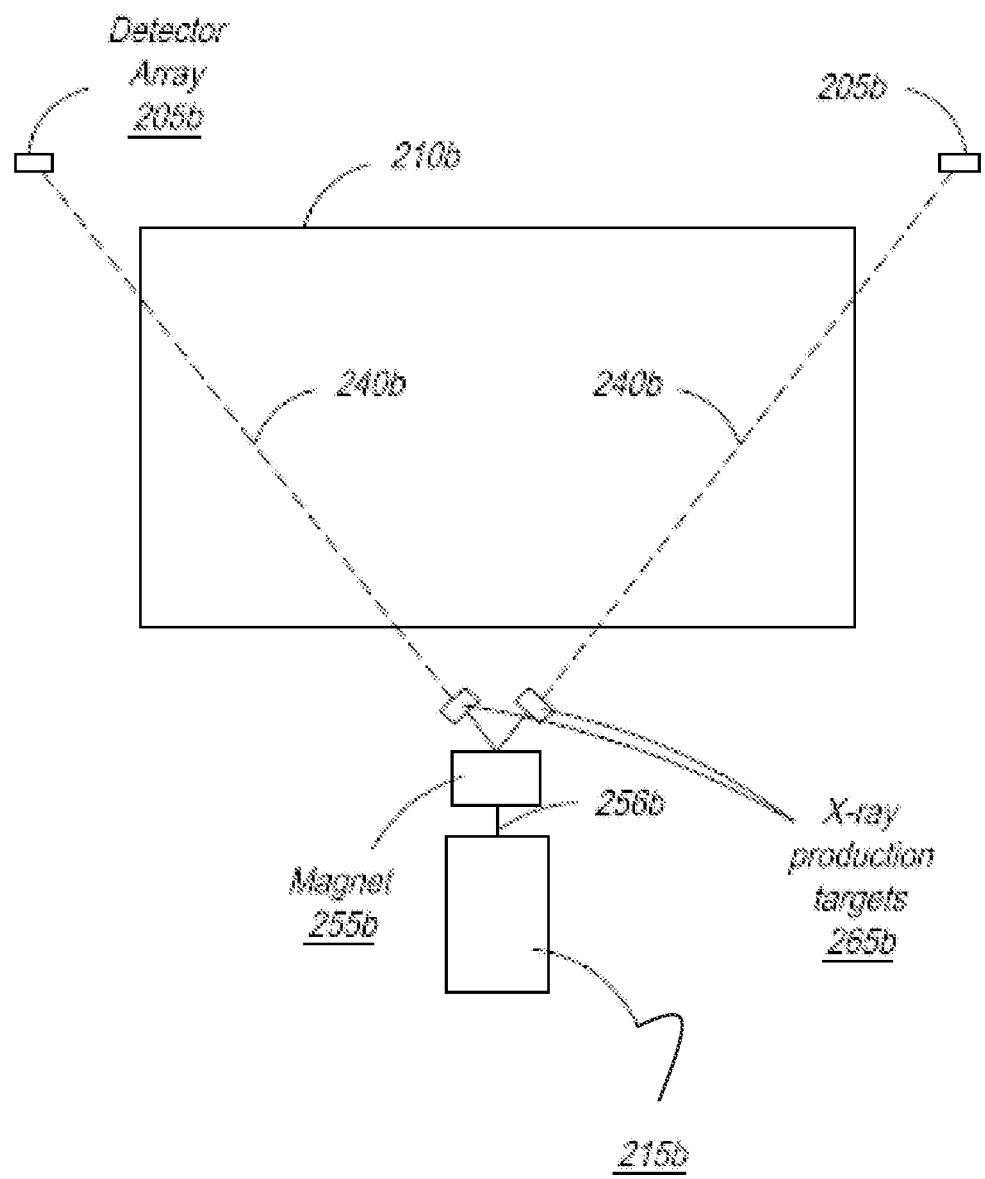
FIG. 2B shows another embodiment of the present invention employing a plurality of X-ray production targets using less than N X-ray sources to generate N multiple views.

FIG. 2B shows another embodiment of the invention comprising an X-ray detection system where the multiple views are generated at substantially large angles. In this embodiment, a single electron source 215b is used in conjunction with a steering mechanism comprising a magnet 255b to direct the electron beam 256b from electron source 215b to two X-ray production targets 265b at an angle larger than 30 degrees from the forward projection of the electron beam. This results in two radiation beams 240b, which are used to scan an object 210b at a large angle from the forward projection axis. Beams 240b are detected by two or more detectors 205b. The advantage of this approach is that for large angles, for example, angles larger than 30 degrees from the forward projection of the electron beam 256b, the resultant produced X-rays are directed towards the detector array resulting in no loss of X-rays due to the angular distribution of the radiation. In addition, the larger angles allow for sampling of the object in vastly different views.

Figure 3A:
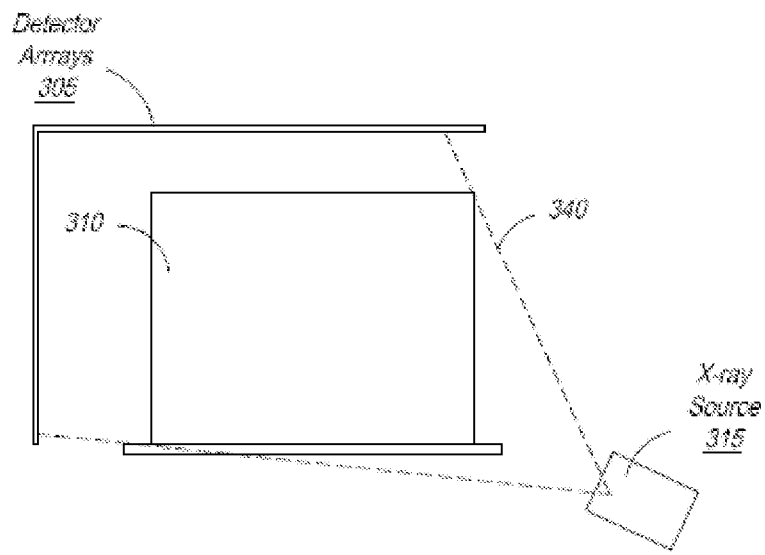
FIG. 3A shows a high energy scanning system with an X-ray source generating a plurality of angled views using multiple detector arrays.
Figure 3B:
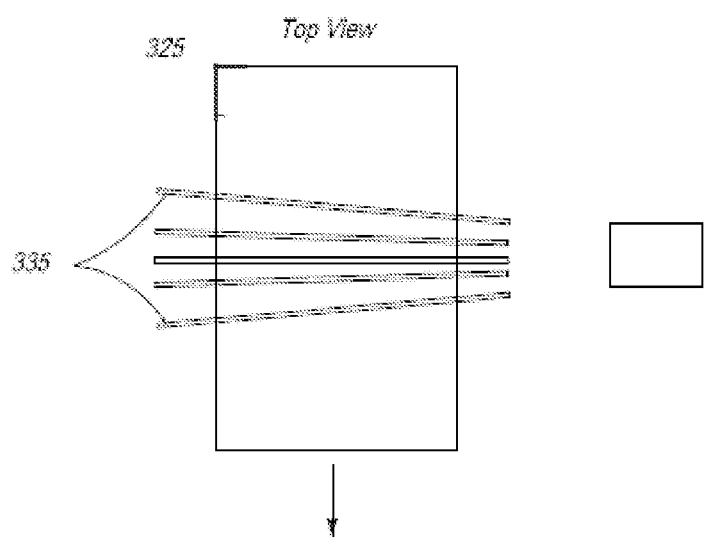
FIG. 3B shows a top view of the high energy scanning system with an X-ray source generating a plurality of angled views using multiple detector arrays, as shown in FIG. 3A.

FIGS. 3A and 3B illustrate a scanning system 300 in which multiple views are generated with a single X-ray source. Referring to FIGS. 3A and 3B, system 300 uses a fan beam of radiation 340 generated from an X-ray source 315 to scan an object 310. After scanning, radiation is detected in multiple detector arrays 305, thereby generating multiple views. A top view 325 shows the N slices, or views, 335, corresponding to multiple detector arrays 305. As shown in FIG. 3B, views 335 are generated at different angles, owing to the detector positions being at various angles (in this case, in 'L' shape) to the X-ray source.

Figure 4A:
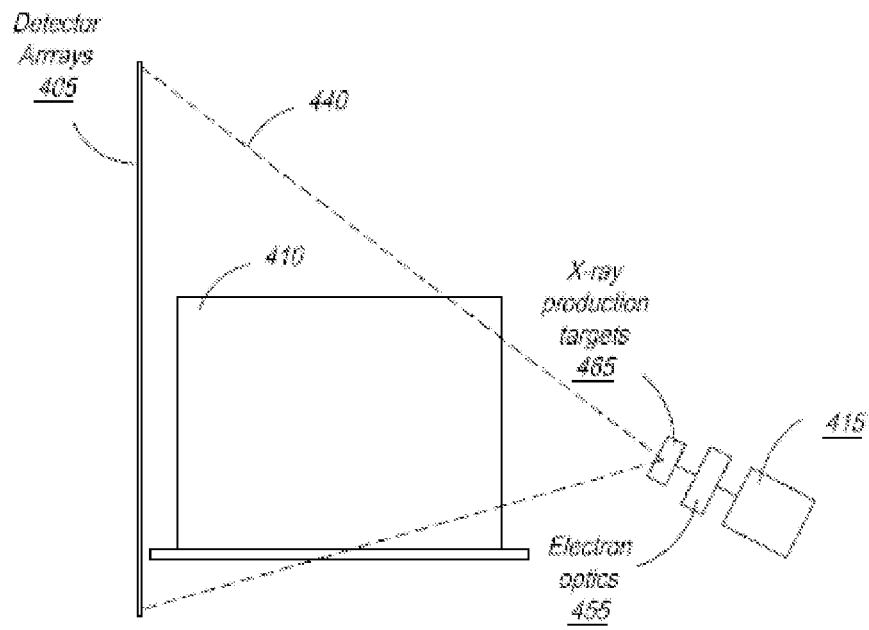
FIG. 4A depicts an X-ray source generating a plurality of views, using at least one detector array and at least one X-ray production target.
Figure 4B:
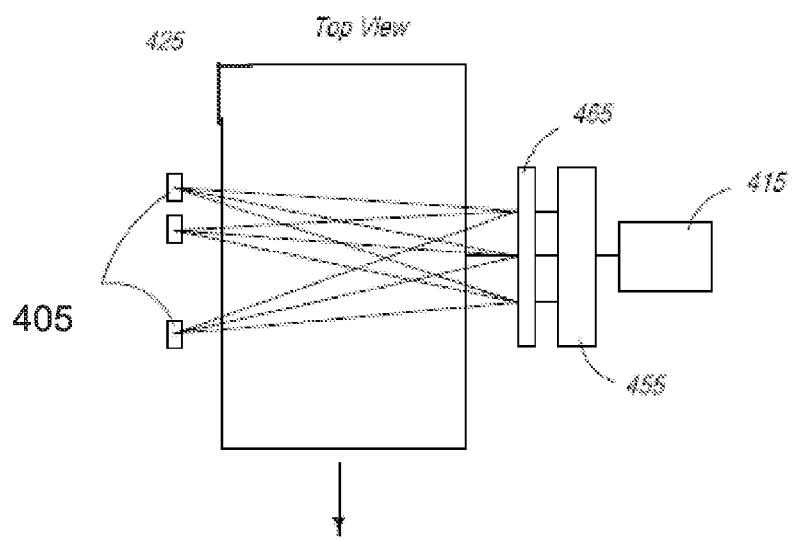
FIG. 4B depicts a top view of an X-ray source generating a plurality of views, using at least one detector array and at least one X-ray production target, as shown in FIG. 4A.

FIGS. 4A and 4B illustrate a method of generating multiple views employed by the present invention. Referring to FIGS. 4A and 4B simultaneously, radiation generated using a single electron source 415 is directed toward cargo 410 using a beam steering mechanism comprising electron optics 455 and at least one associated X-ray production target 465, as described earlier. In this case, only one electron source is used, but X-ray radiation 440 is directed such that multiple views are generated for each target. Radiation 440 is detected by a plurality of detector arrays 405, each of which comprises a plurality of detectors arranged in a straight (in this case, vertical) line. The linear detector arrays are parallel to each other. The number of views and the number of X-ray production targets 465 are preferentially different, generating a multiplicity of angles traversing object 410 originating from the different X-ray production targets 465 and detected by arrays 405. Thus, for example, N X-ray production targets coupled with M detector arrays can produce up to N×M views. While some of these views are parallel, they are timed to scan a different portion of the cargo. The different numbers of views improves the quality of the reconstructed image. Further, arranging the detectors in a vertical straight line allows the same array to be used for multiple sources or X-ray production targets, without requiring complicated collimation, or having an open beam that would increase the radiation dose and scatter.

Figure 10:
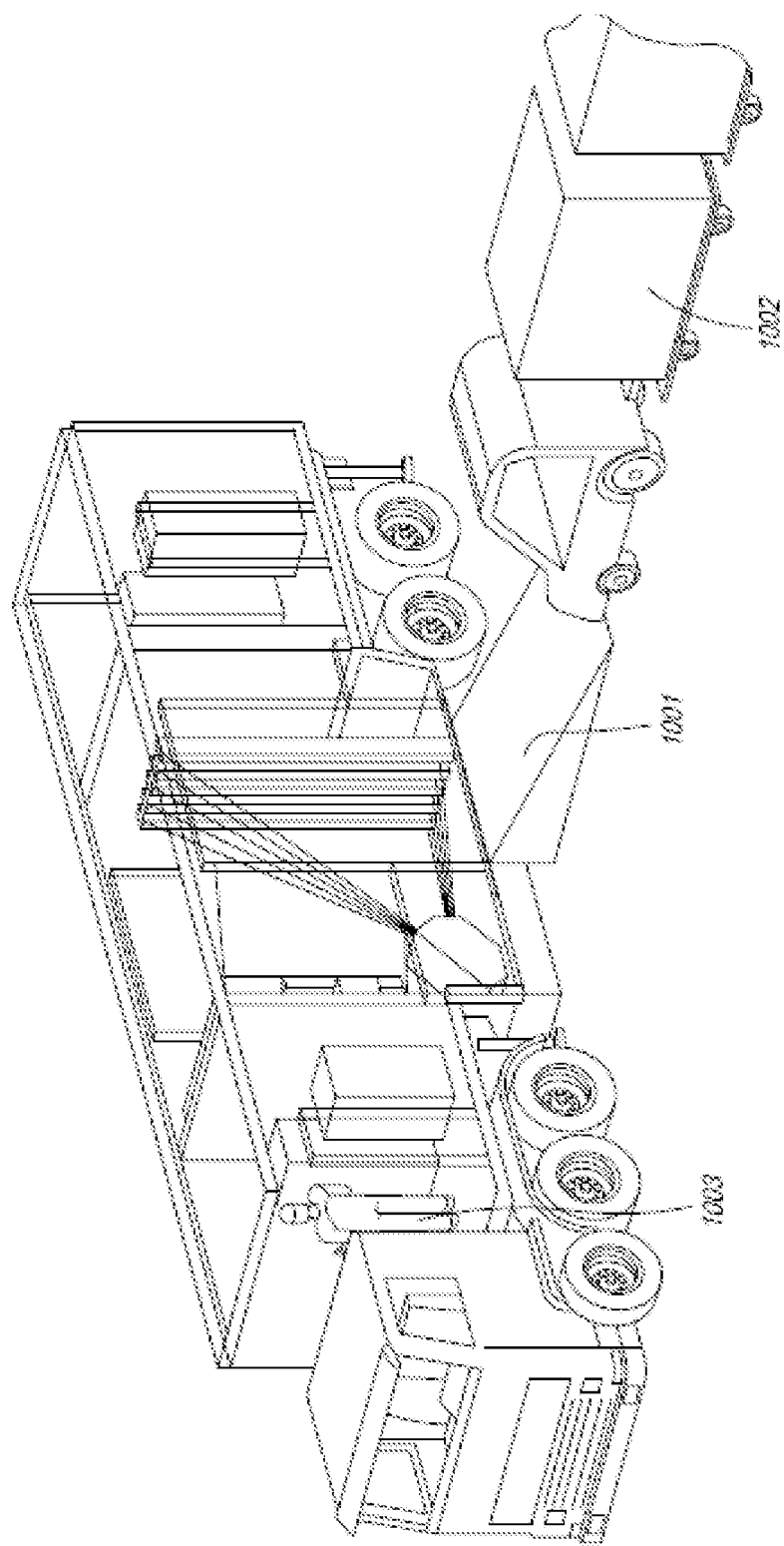
FIG. 10 illustrates another embodiment of the mobile inspection system that uses a ramp for drive-through inspection with multiple views.

In one embodiment, the object moves at constant speed (or nearly constant but measured speed, e.g. radar). While it is preferred that the speed is constant, any variation in speed can be compensated for during measurement by triggering the sources based on speed. In one embodiment, the object is moved on a conveyor. In another embodiment, and as shown in FIG. 10 below, the object can be towed through the scanning system via use of a vehicle.

The electron beam is steered rapidly to each radiation-producing target in sequence. Each of the detector arrays measures the radiation from each beam position.

This multiplicity of angles is employed to produce a plurality of X-ray images, or to reconstruct a laminographic image of object 410 allowing for depth information to be obtained. As shown in FIG. 4B, a top view 425 shows the slices or views, corresponding to the plurality of detector arrays 405.

For dual-energy inspection, the beam is interlaced and requires switching the position at double the rate. The rate would be the same, however, if two detector arrays are used per "tower". In the dual-energy case, atomic-number information will also be generated.

Figure 5:
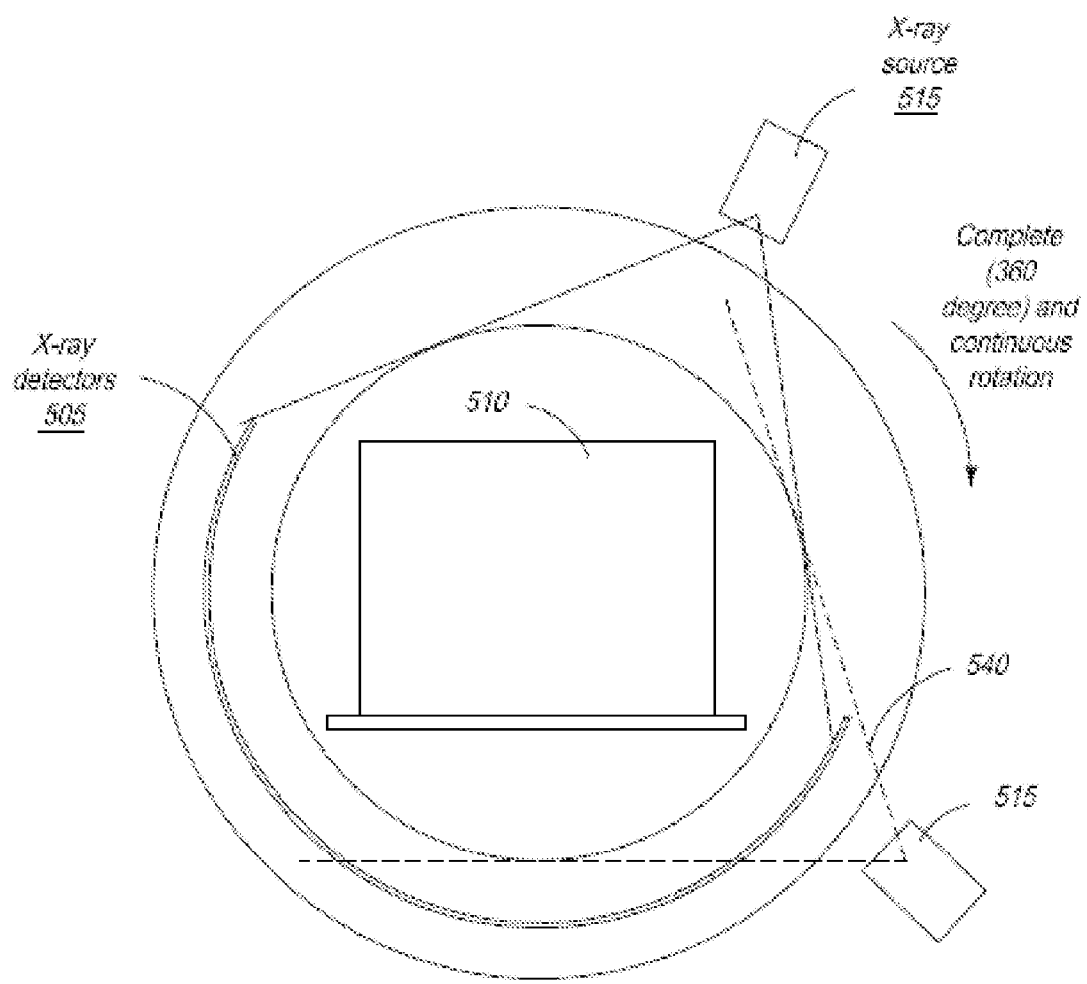
FIG. 5 illustrates a conventional, known CT system that employs multiple sources and multi-slice detectors.

Conventional Computed Tomography (CT) systems, shown in FIG. 5, employ a single source 515 to emit radiation 540. X-ray source 515 in combination with X-ray detectors 505, conduct a complete and continuous rotation around scanned cargo 510 using mechanical rotation.

In some embodiments, the present specification describes a system and method for Electron Beam Transport (EBT) in a dual energy CT system. In one aspect, the present invention is directed towards an imaging system and method for producing electrons and steering them towards at least one target, which, in turn, produces at least one radiation beam that is directed towards an object under inspection. Embodiments of the present invention thus include systems and methods for using a radiation source, such as a linear accelerator (linac) for producing an electron beam, and electromagnetically steering or transporting electrons towards a target. Electrons may be produced in a fashion that yields the appearance of rotation, without actually requiring mechanical rotation of the source or targets. While systems for EBT exist and are known to those of skill in the art, it is difficult to achieve EBT in high energy applications, ranging from 1 Mega Electron Volt (MeV) and upwards to allow the penetration of large and dense objects.

In one aspect, the present invention provides a system and method for rapidly transporting pulsed electrons to the target, for example at a frequency of roughly 500 Hz. In another aspect, the present invention provides a system and method for allowing transport of multiple energies within a specified range without modifying the current of the electromagnetic components involved in transporting the electrons. Thus, in some embodiments, the present invention provides a method for interlacing energies using a multi-energy source whereby the resultant electrons reach the x-ray production target at approximately the same location.

In some embodiments, the radiation source used to produce the beam of electrons is a linear accelerator (linac). Note that in some embodiments only one radiation source is employed. In some embodiments, the electron beam produced by the linac comprises two or more energies in an interlaced mode. In other embodiments, the electron beam is a single energy beam. While some embodiments of the present invention are described with respect to use of a linac as the source, it would be apparent to persons of skill in the art that a number of radiation sources such as microtrons, Betatrons and Rhodotrons may also be used in alternative embodiments to produce a virtual rotation of the X-ray beam around an object being scanned. In some embodiments, multi-slice detectors are employed to allow for faster throughput and better dual-energy registration.

Figure 7:
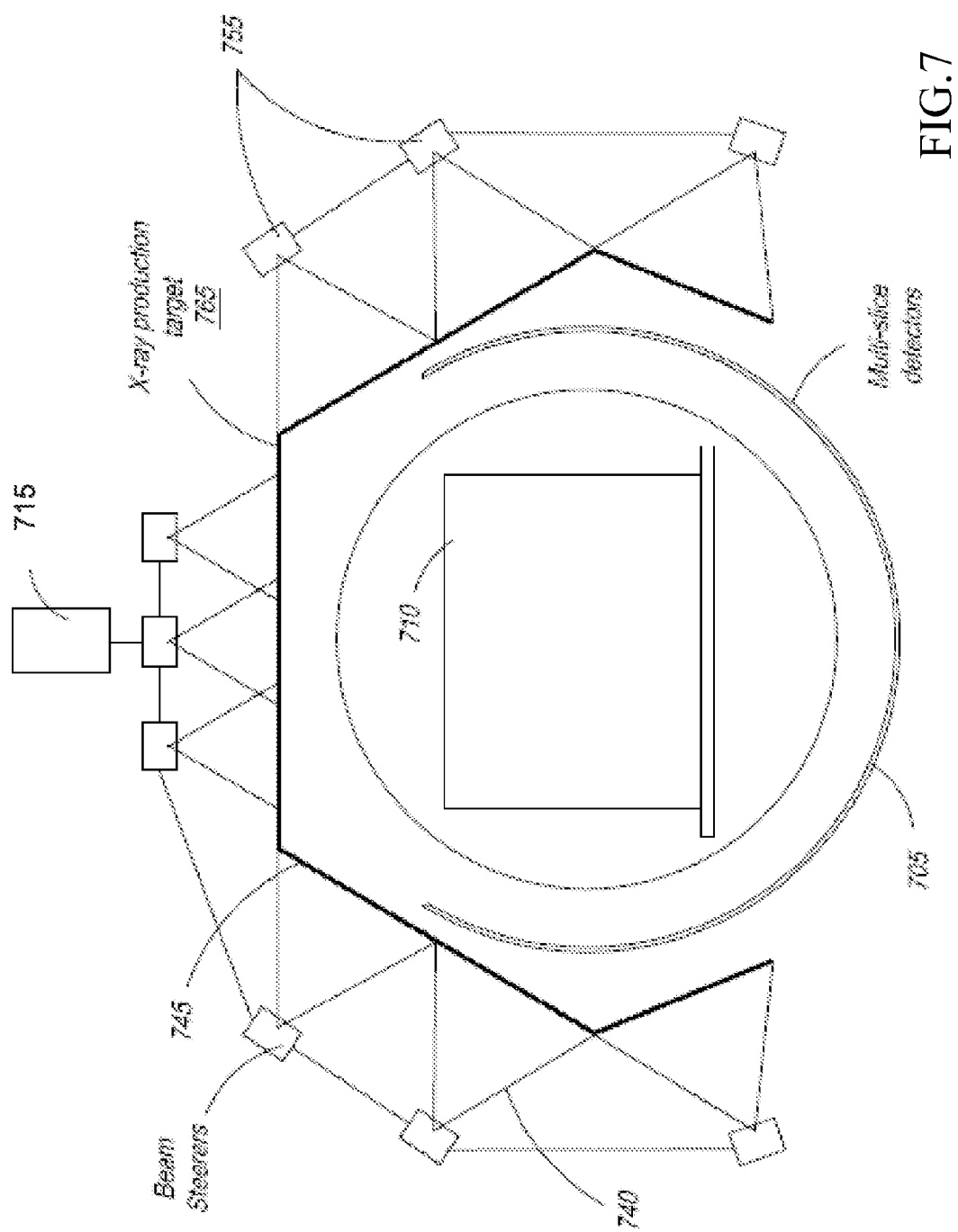
FIG. 7 illustrates a second embodiment of the CT system of the present invention.

Referring to FIG. 7, in yet another embodiment, an electron beam 740, generated from an electron source 715, is rastered along an approximated arc by beam steerers 755, which, in an embodiment, comprise a combination of magnets and quadrupoles 755. The electron beam is directed toward at least one X-ray production target 765 to produce a "rotating" X-ray beam (stationary gantry) 745, while an object 710 is translated at a constant speed. X-ray production targets 765 are arranged about the scanning volume such that an electronic rotation of X-ray beam 745 can be achieved. Radiation is detected by multi-slice detectors 705. In contrast with low-energy (140 kV) electron beam CT systems employed in medical applications where a reflection geometry is used, the electron beam direction and the X-ray observation angle has to be substantially along the same direction of the electron beam because the angular distribution of the bremsstrahlung radiation is forward peaked at megavoltage energies and nearly isotropic at lower energies.

With a large number of views, CT embodiments of the present invention can produce high-resolution 3D "density" and effective Z images with little or no object superposition. Density and Z are then used to determine composition of cargo and enable material discrimination. The CT embodiments can further determine density and Z variations in depth for improved detection of contraband. These embodiments of the present invention also efficiently detect high-density materials, which may indicate possible nuclear and shielded radioactive materials.

Figure 11:
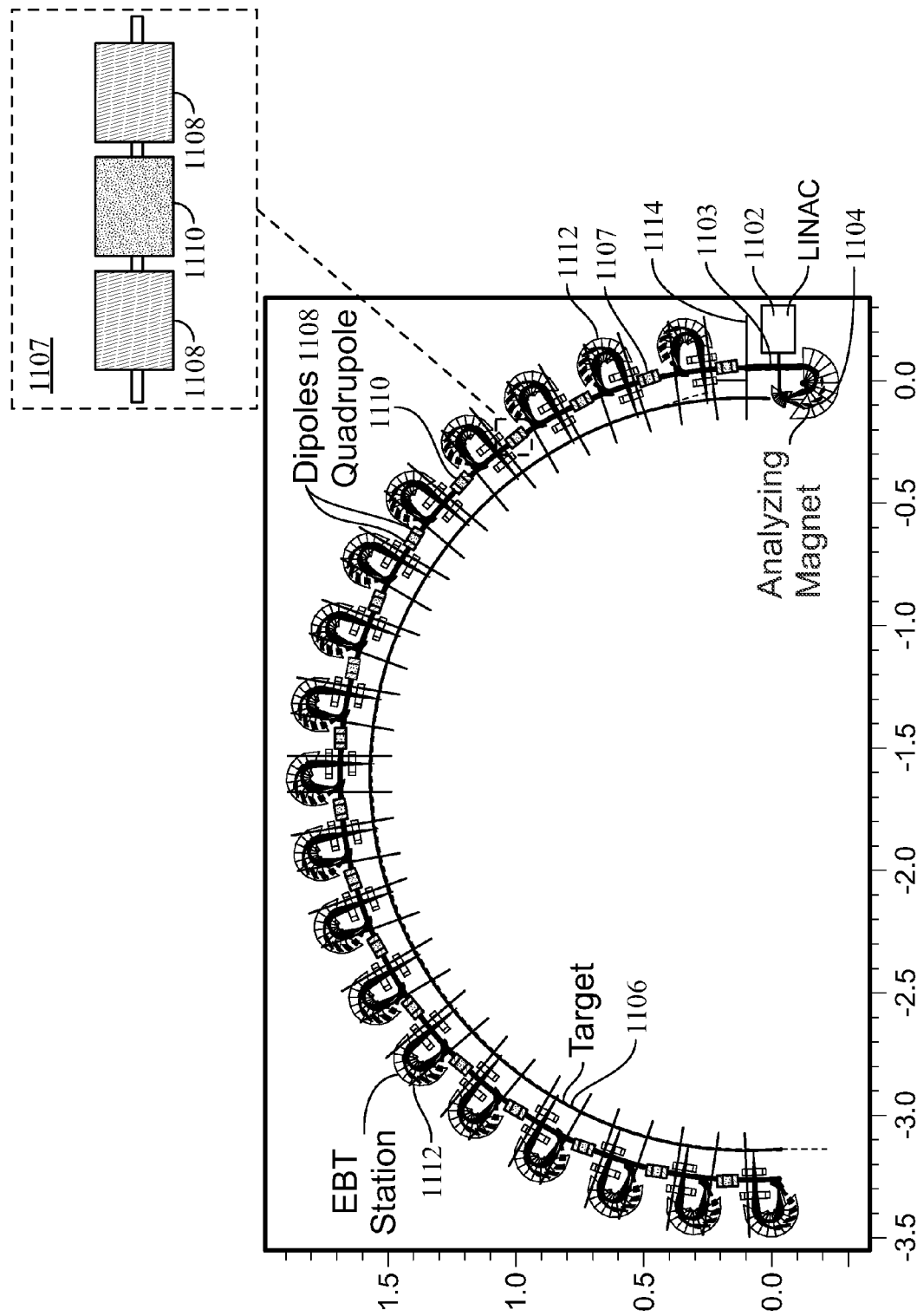
FIG. 11 illustrates a method of Electron Beam Transport (EBT) in a dual energy multi-view system, in accordance with an embodiment of the present invention.

Referring now to FIG. 11, an electron beam 1103 is produced by an electron source 1102, which is followed by an analyzing magnet 1104 that provides for both transporting of multi-energy beams and removing low-energy electron tail (if it exists). In one embodiment, and as described above and with respect to FIGS. 11, 13, 14A and 14B, electron source 1102 is a linac and is used to produce electron beam 1103 comprising two or more energies in an interlaced mode. Thus, in one pulse, a beam having a first energy is produced. In the next pulse, a beam having a second energy is produced. In the next pulse, a beam having an n energy is produced. Thus, any number of energies can be used with the present invention, although in a preferred embodiment, two energies are used.

In this embodiment, analyzing magnet 1104 in conjunction with electron slits is employed to filter out low energy components of electron beam 1103 and to steer the high-energy electron beam produced by a linac into an electron beam transport (EBT) system. In this embodiment, analyzing magnet 1104 comprises two direct current (DC) magnets, and is described in greater detail with respect to FIG. 13.

Appropriate shielding is placed around magnet 1104 since the filtered low-energy electrons hit the slits and produce undesired X-rays.

A first double-bend magnetic element or achromat 1107 (shown in an expanded view window), which in an embodiment is a plurality of magnets comprising two dipoles 1108 and one quadrupole 1110 positioned between the two dipoles 1108, is employed for bending a resultant electron beam 1114 in a curvilinear trajectory to at least one EBT station 1112. The first double-bend achromat 1107 is positioned after analyzing magnet 1104 and causes resultant electron beam 1114 to be deflected to a first EBT station 1112. Thereafter, a plurality of EBT stations 1112 are placed between magnetic elements or achromats 1107 along a path, which allow beam 1114 to be deflected and focused onto at least one target 1106. The path may be circular or arcuate.

Now referring to the first set of magnets of FIG. 13, at least one analyzing magnet 1306 (shown as 1104 in FIG. 11) is used to transport the electron beam into an electron beam transport (EBT) system, in accordance with an embodiment of the present invention. The analyzing magnets 1306, 1312 are used in conjunction with collimators to eliminate the low-energy electron tail and steer the electron beam towards and into the EBT system. As mentioned above, the linac station may comprise two DC magnets, a first magnet that is employed to bend the electron beam through an angle of approximately 90 degrees and a second magnet that is employed to bend the electron beam through an angle of approximately 180 degrees. It should be noted that a single magnet cannot steer two electron beams with different energies such that they end up parallel to each other along the same trajectory, except if the magnetic field is changed by varying the current flowing through the magnets. Changing the current, however, is time consuming and may not be possible at ~400 Hz. Thus, two magnets are employed such that when combined, they steer electron beams within a range of energies (as described below) such that they end up in parallel trajectories. It should also be noted that while the present invention is described with respect to 90 and 180 degree magnets, any combination of magnets may be employed as long as it achieves the objectives of the present invention.

As illustrated, an electron beam 1302 is generated by a source (which may be a linac) 1304. The two linac magnets 1306 and 1312 are employed and arranged to bend an electron beam in a specific range of energies through a total angle of exactly 270 degrees. The energies may range from 1 MeV and upwards. In one configuration, multiple electron beams are pulsed such that they are bent by the linac magnets one after another. In another configuration, 3 MeV and 5 MeV electron beams are employed. 3 MeV and 5 MeV are exemplary dual energies; however, it should be understood to those of skill in the art that any combination of energies may be used so long as it achieves the objective of the present invention. In one embodiment, 3 MeV and 5 MeV energies are chosen as these energies are sufficient to penetrate most air cargo. In the configurations described below, it is possible to design a system such that it is capable of penetrating larger or denser cargo. In another configuration, 6 MeV and 9 MeV electron beams are employed. The magnets 1306 and 1312 bend the electron beams in a specific range of energies through a total of 270 degrees in such a way that they converge and exit at the same location, resulting in parallel electron beams. Parallel dual-energy beams 1314 are transported to the EBT targets, as shown in greater detail in FIGS. 14A, 14B, and 14C.

Figure 14A:
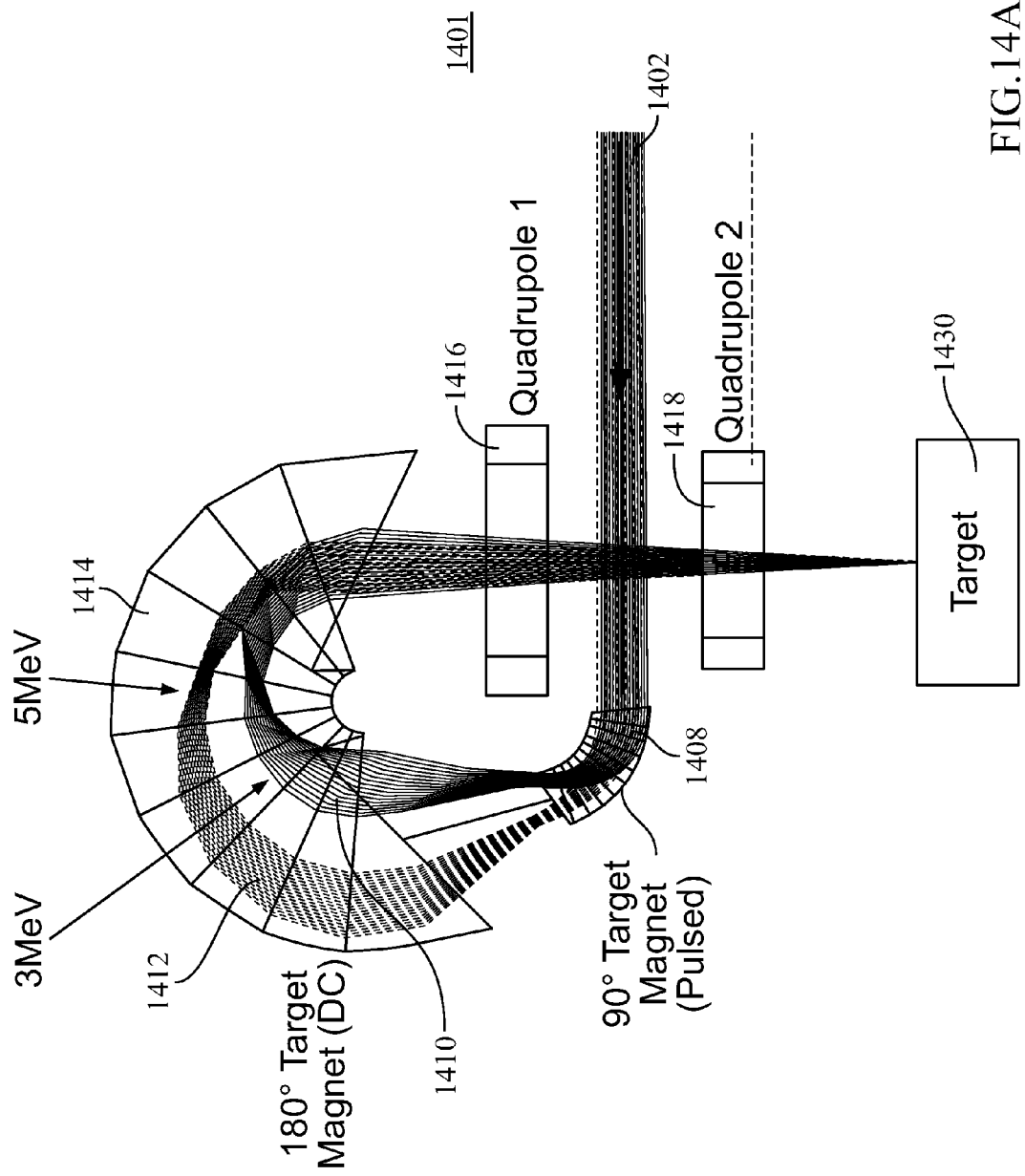
FIG. 14A illustrates an EBT station showing a method of transporting a dual-energy, high-energy electron beam from the EBT station to a target, as shown in FIG. 11.

FIG. 14A illustrates an EBT station 1401 showing a method of transporting a dual-energy, high-energy electron beam to a target, as shown in FIG. 11 as 1112. Referring now to FIG. 14A, electron beam 1402 (shown in FIG. 11 as resultant electron beam 1114 exiting the analyzing magnet 1104) is sent through a first achromat and then through EBT station 1401, where upon entry, the beam 1402 is bent approximately 90 degrees by a pulsed target magnet 1408 towards the 180 degree DC target magnet 1414, where it is then bent by approximately 180 degrees for a total of 270 degrees. The beams having two different energies 1410, 1412 pass through quadrupoles 1416 and 1418 which are used to focus the beams in two orthogonal directions x, y to maintain a small focal-spot size of a couple of millimeters when the beam hits a target 1430. The focal spot size may range from 1 mm to 2 mm. This also ensures that the beams, having different energies, hit the target at roughly the same position yielding better image quality. Quadrupoles 1416 and 1418 are pulsed for multi-energy electron transport.

Each EBT station is necessarily separated from adjacent stations by a distance due to physical constraints, and more specifically, a distance that corresponds to the size of the magnets, which is roughly 1 linear foot. This necessary separation results in a limit to the number of views, thus in order to obtain more views, it is possible to generate more positions at which the beam hits the target. Each EBT station may have an additional component used to steer the beam into different angles to hit the target at different positions. The additional component may be a horizontal steering magnet, such as an air core dipole coil.

Figure 14B:
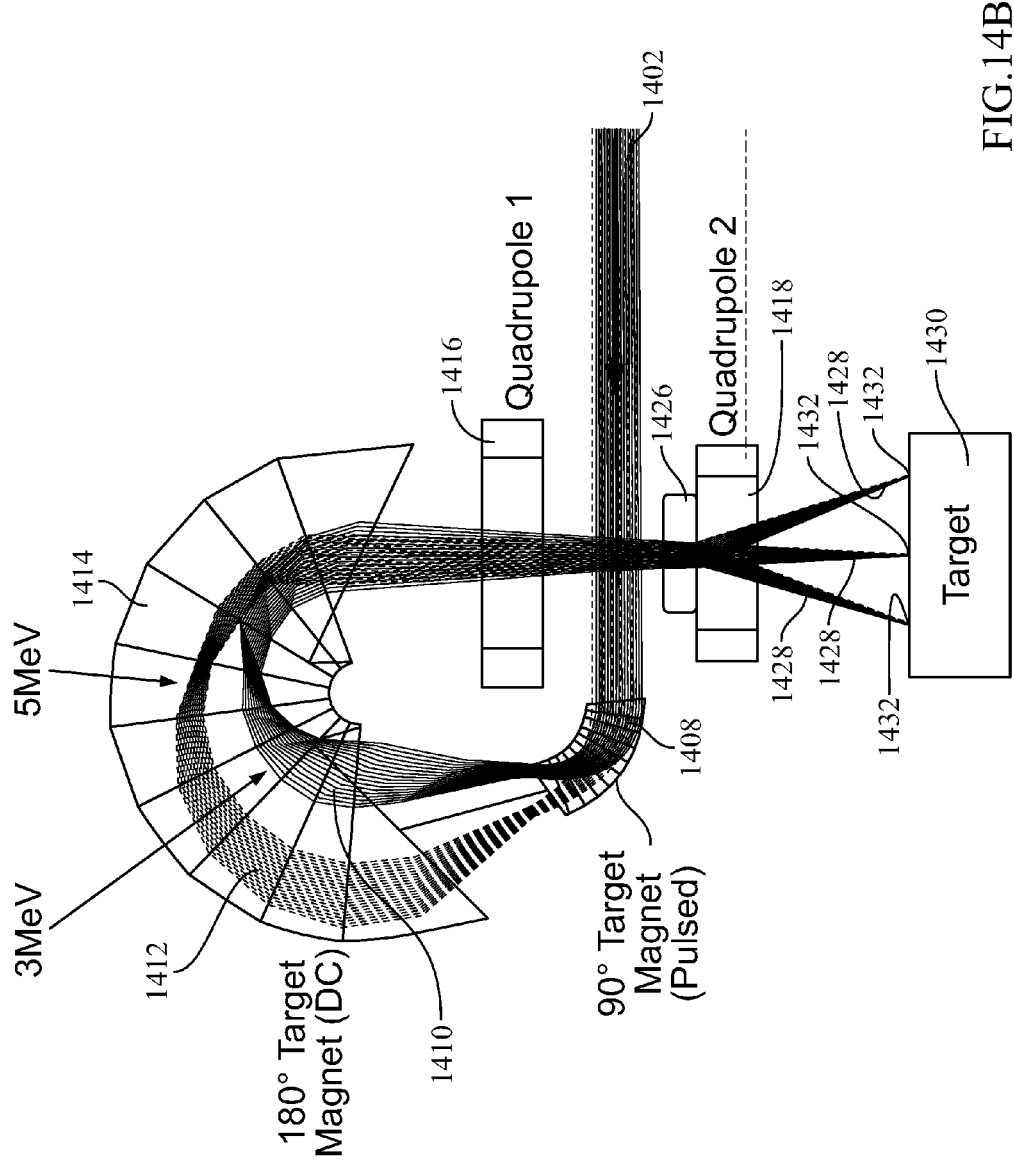
FIG. 14B is another illustration of a method of transporting an electron beam from an EBT station to a target where each EBT station, using a dipole or scanning magnet in a first placement, steers the beam to multiple positions on the target.

FIG. 14B is another illustration of a method of transporting an electron beam to a target where each EBT station, using a dipole or scanning magnet in a first placement, steers the beam to multiple positions on the target. As shown in FIG. 14B, electron beams 1402 are bent approximately 90 degrees by pulsed target magnet 1408 towards 180 degree DC target magnet 1410, where it is then bent approximately 180 degrees for a total of 270 degrees. The two different energy beams 1412 and 1414 converge and then pass through quadrupole 1416 which is used to focus the beams in two orthogonal directions x, y to maintain a small focal-spot size of a couple of millimeters when the beam hits target 1430. The focal spot size may range from 1 mm to 2 mm.

A steering magnet 1426 is used to steer the beam to multiple locations on target 1430 in each pulse. After hitting steering magnet 1426, the beams pass through quadrupole 1418 for focusing. While the steering magnet 1426 will have a slight effect on the beam center as the beams approach quadrupole 1418, it will not affect the focusing of the beam on the target. Multiple parallel beams 1428 hit target 1430 at different locations on the target to generate additional x-ray source positions 1432.

Figure 14C:
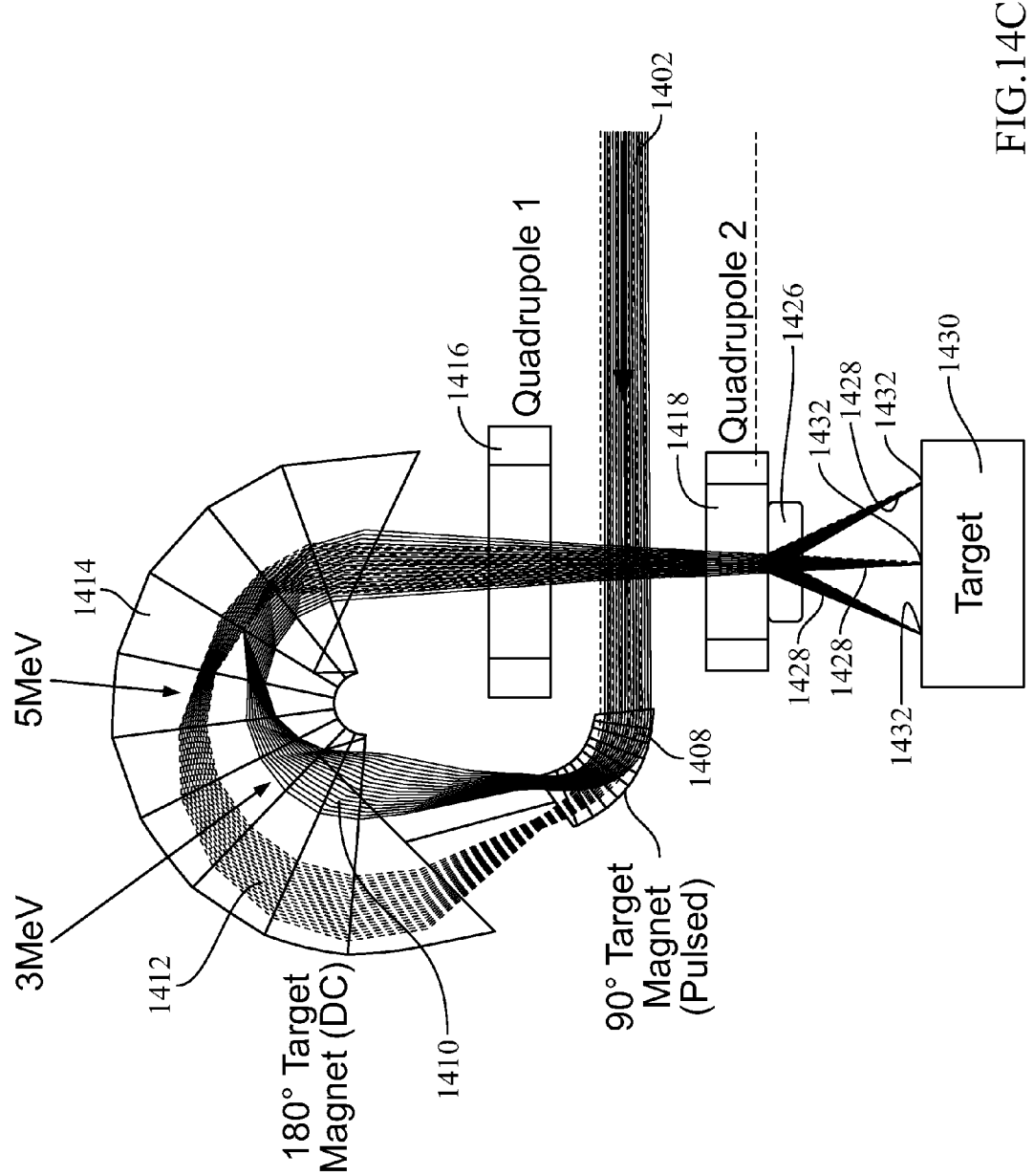
FIG. 14C is yet another illustration of a method of transporting an electron beam from an EBT station to a target where each EBT station, using a dipole or scanning magnet in a second placement, steers the beam to multiple positions on the target.

FIG. 14C is yet another illustration of a method of transporting an electron beam to a target where each EBT station, using a dipole or scanning magnet in a second placement, steers the beam to multiple positions on the target. As shown in FIG. 14C, electron beams 1402 are bent approximately 90 degrees by the pulsed target magnet 1408 towards the 180 degree DC target magnet 1410, where it is then bent approximately by 180 degrees for a total of 270 degrees. The electron energy beams 1412 and 1414, generated at each pulse in succession, pass through quadrupoles 1416 and 1418 which are used to focus the electron beams in two orthogonal directions x, y to maintain a small focal-spot size of a couple of millimeters when the beam reaches steering magnet 1426. Steering magnet 1426 is used to steer the beam in multiple locations on target 1430. Electron beams 1428 hit target 1430 at different locations on the target to generate additional x-ray source positions 1432 in each pulse.

The X-ray observation angle is substantially along the same direction as the electron beam, as the angular distribution of bremsstrahlung radiation is forward peaked at megavoltage energies, rather than nearly isotropic as is the case at lower energies. The electron beam is transported to multiple sparse targets each one associated to one or more detector arrays to reconstruct laminographic images.

In both embodiments, the scanners employ dual-energy interlaced X-ray sources to obtain density and effective Z images of the cargo. The beam is typically pulsed at 300 pulses per second. In alternative embodiments, the beam is pulsed at 500 Hz or higher.

Figure 12:
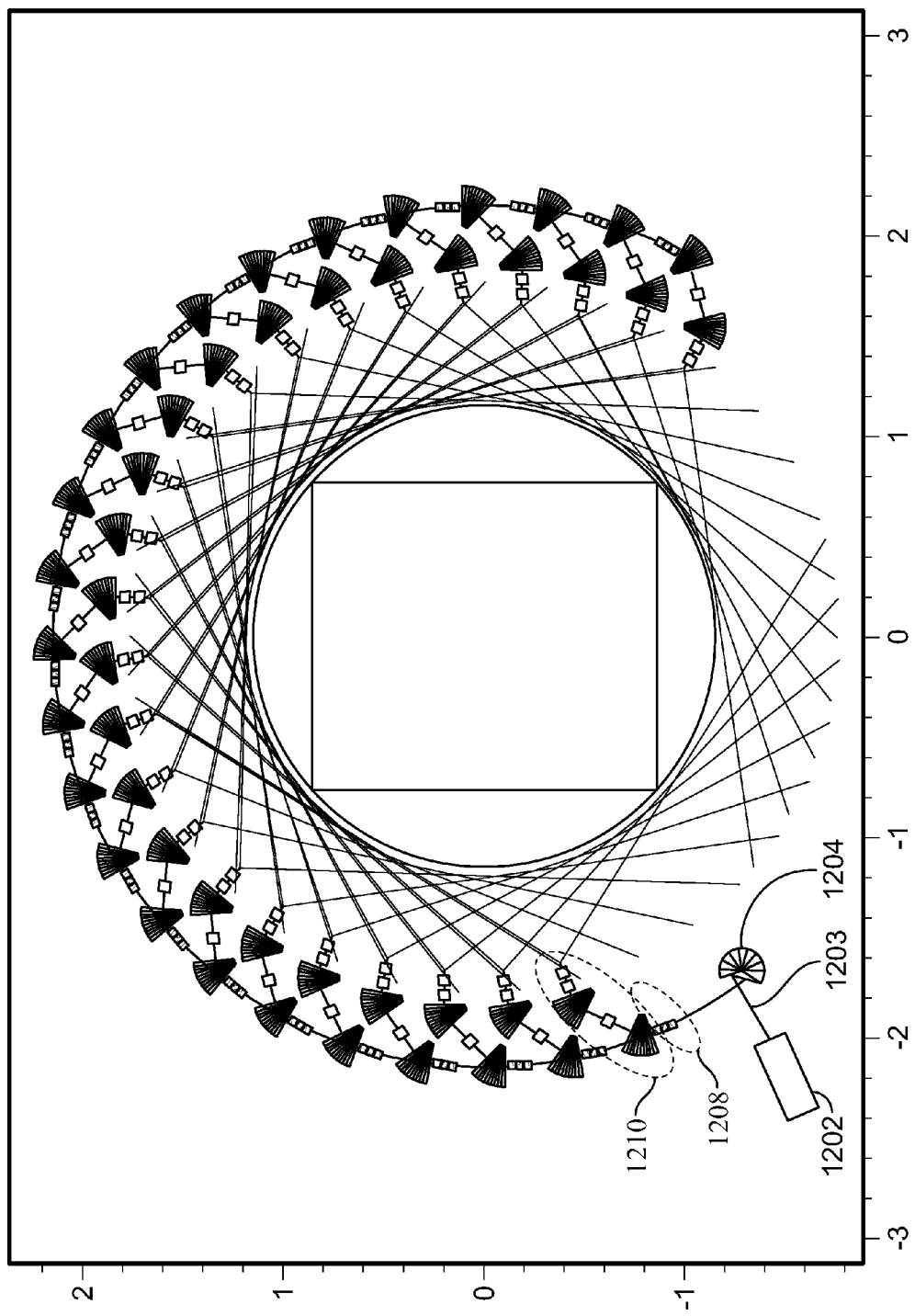
FIG. 12 illustrates a method of EBT in a single energy multi-view system, in accordance with an embodiment of the present invention.
Figure 15:
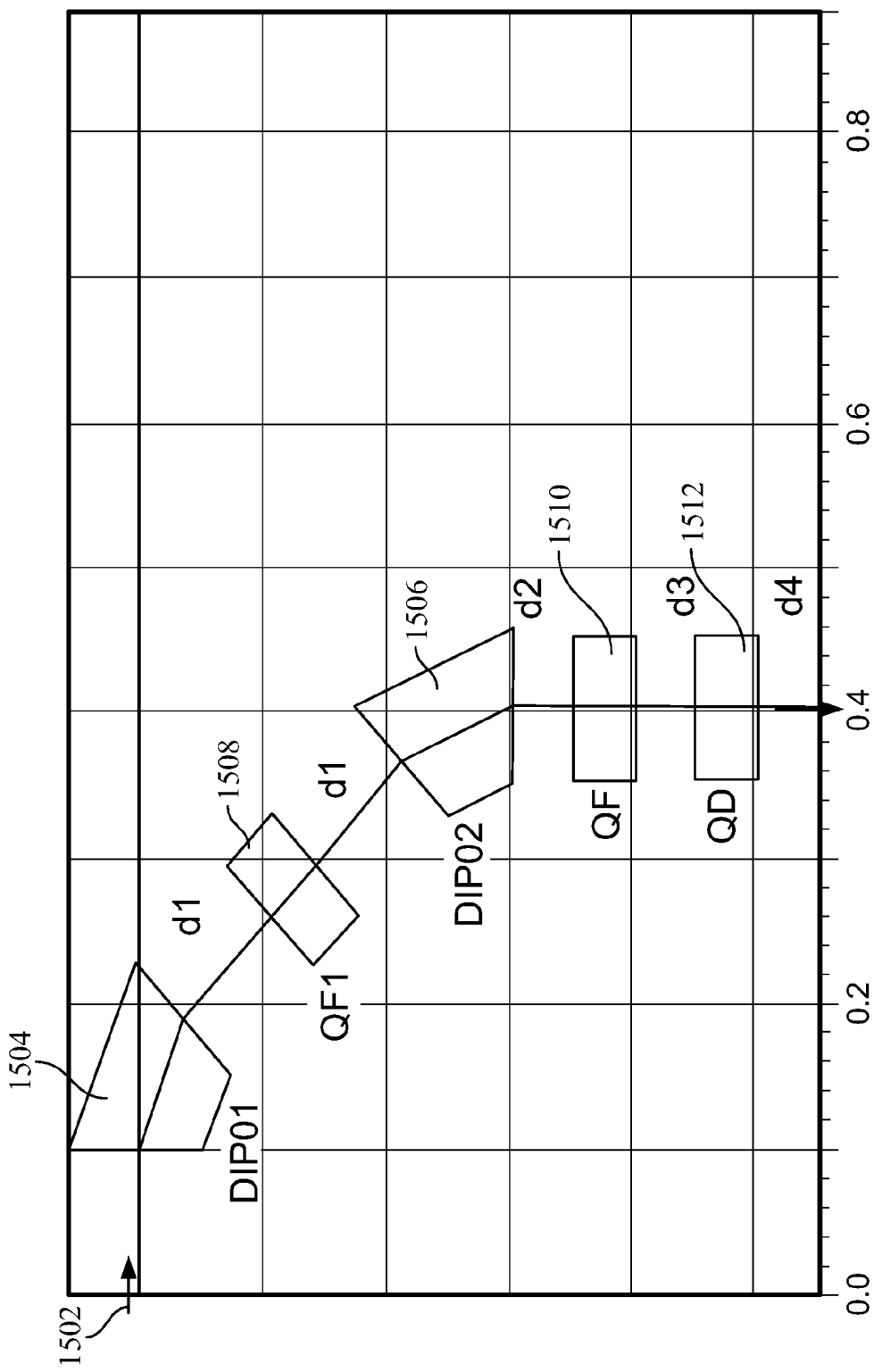
FIG. 15 is a graphical illustration of an EBT station used to direct a single-energy electron beam into a target, in accordance with an embodiment of the present invention, as shown in FIG. 12.
Figure 16:
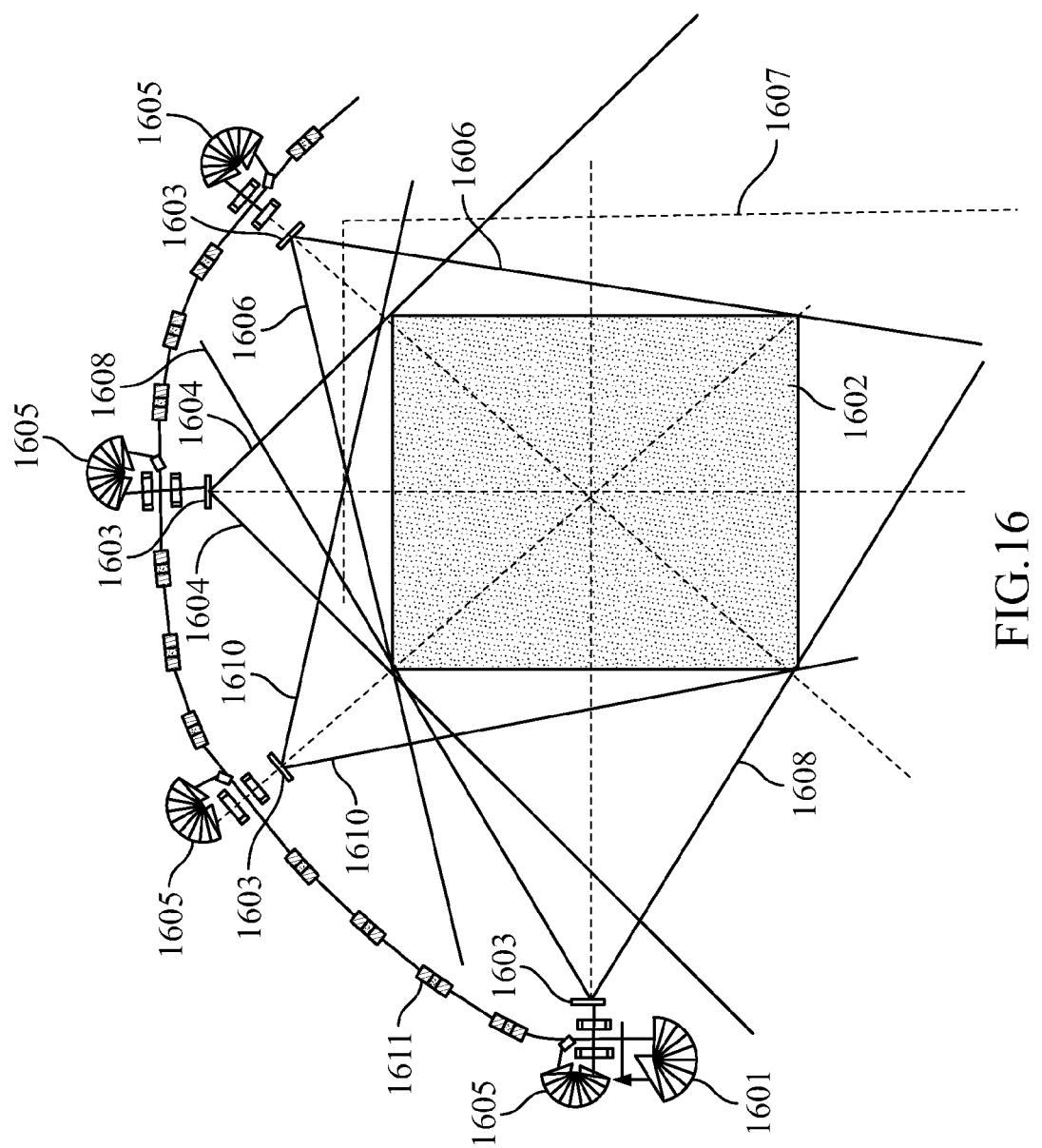
FIG. 16 illustrates a method of EBT in a multi-view system comprising four targets, in accordance with an embodiment of the present invention.

In another embodiment, described with respect to FIGS. 12, 15, and 16, the electron source is a linac and is used to produce an electron beam comprising a single energy. It should be noted that while this configuration is most suitable for single energy applications, it can be used for dual energy applications if all magnets are pulsed.

FIG. 12 illustrates a method of EBT in a single energy multi-view system, in accordance with an embodiment of the present invention. As illustrated, an electron beam 1203 is produced by an electron source 1202, which is focused by a single energy 270 degree first magnet 1204. The first magnet is used, in an embodiment, in combination with slits to filter out low energy electron components. From single energy analyzing magnet 1204, the electron beam 1203 passes through a first achromat 1208, described in greater detail above with respect to FIG. 11. Once the beam passes through a first achromat 1208, beam 1203 is directed towards an EBT station 1210. EBT station 1210 comprises one 45-degree magnet followed by a quadrupole and a second 45 degree magnet followed by two quadrupoles, and is described in greater detail with respect to FIG. 15.

Thus, in some embodiments, the electron beam transport station includes a first dipole magnet to extract electrons from the beam and a second dipole magnet for bringing electrons having different energies from the first magnet onto the same trajectory, wherein the sum of the angles of the magnets is approximately 90 degrees and wherein the first magnet is roughly 45 degrees and the second magnet is roughly 45 degrees. Further, a quadrupole magnet is placed symmetrically between the first and second dipole magnets. Still further, two quadrupoles, as described with respect to FIG. 15 are employed to focus the beam on the target in orthogonal directions to achieved the desired focal-spot size.

In some embodiments, the production target is an extended target. In alternate embodiments, a separate target is employed for each electron beam transport station.

Using at least two energies enables the system of the present specification to obtain atomic number information. As described above, in some embodiments, the system is capable of operating with two beam energies. In other embodiments, however, only one energy beam can be transported at a time. Thus, a beam with one energy is transported and the object is scanned.

A second high energy radiation beam is generated after the first scan process by changing a magnetic parameter of the system to enable a dual-energy scan. In one embodiment, the current of the magnetic elements is changed (<1 sec) so another beam energy can be transported. The object is then rescanned at the second energy and data from both energies is combined to obtain atomic number information.

FIG. 15 is a graphical illustration of the EBT station described in FIG. 12 used to direct a single-energy electron beam into a target, in accordance with an embodiment of the present invention. As illustrated, an electron beam 1502 is bent by an angle of 45 degrees by means of two dipole magnets (dipoles) 1504, 1506 arranged as illustrated with a quadrupole magnet 1508 placed symmetrically between dipoles 1504, 1506. Bent electron beam 1502 is next focused into a target by two quadrupoles 1510 and 1512.

In a similar embodiment shown in FIG. 14B and FIG. 14C, the electron beam can be directed to multiple target positions employing a steering magnet placed before or after quadrupole 1512 to generate additional x-ray source positions.

FIG. 16 illustrates a method of EBT in a multi-view system comprising multiple targets, in accordance with an exemplary use embodiment of the present invention. In this embodiment, each EBT station can be a single or dual energy station. The illustrated embodiment employing four targets is suitable for laminographic applications. In the illustrated embodiment, an analyzing magnet 1601, shown and described in more detail with respect to FIG. 13 and four EBT stations 1605 shown in more detail in FIG. 14A are employed to scan an object 1602 by means of four X-ray fan beams 1604, 1606, 1608 and 1610. Specifically, an electron beam is produced by an electron source (not shown), which is focused by analyzing magnet 1601. A plurality of double-bend achromats 1611, described in greater detail with respect to FIG. 11, are positioned between EBT stations 1605 along a path, which allow the beam to be deflected and focused onto at least one target 1603. In one embodiment, the path is circular or arcuate.

Each of targets 1603 used in the embodiment illustrated in FIG. 16 is associated with one or more detector arrays 1607 to increase the number of views and improve the quality of the reconstructed images.

As described above, the present specification is directed towards the use of radiation generated by any charged particle when impinging on a target, wherein the radiation is directed toward cargo using a beam steering mechanism and at least one associated radiation production target. In some alternate configurations, low-energy deuterons can be employed to impinge upon a tritium target to implement neutron tomography. In other alternate embodiments, high-energy deuterons can be accelerated toward a deuterium or beryllium target. Other reactions may include protons on lithium.

In one embodiment, the source is a source for generating charged particles, such as deuterons. Thus, optionally, a particle accelerator can be employed. If a particle accelerator is employed, the targets consist of neutron production materials (e.g. tritium or deuterium) to produce neutrons. Referring back to FIG. 12, in this alternate configuration, source 1202 is a particle accelerator. Further, magnetic elements or components used to steer charged particles are represented by 1204 and 1208. Thus, a system for producing a plurality of neutron beams, as used in the present invention would include a particle accelerator for producing charged particles, a beam steering system to direct the charged particles to plurality of locations along the target; an extended target; a plurality of neutron detector arrays; a mechanism for translating the object through the system (as described below); and a processor to combine the detector information to produce tomographic images of the object. In some embodiments, the extended target is a single target that all of the generated particle beams hit or individual targets for every beam.

Further, the charged particle may be one of a low-energy deuteron (<500 kV) wherein the extended target is tritium; a high-energy deuteron (>3 MV) wherein the extended target is deuterium; or a proton wherein the extended target is lithium. Further, in some embodiments, the target is shaped as a circular arch.

The various embodiments of the inspection system described above can be implemented in mobile and transportable configurations such that they can be deployed quickly with relatively low footprint requirements. In addition, the use of a single source to achieve images with depth information further allows for mobility of the system, due to lower space and weight requirements.

Figure 8:
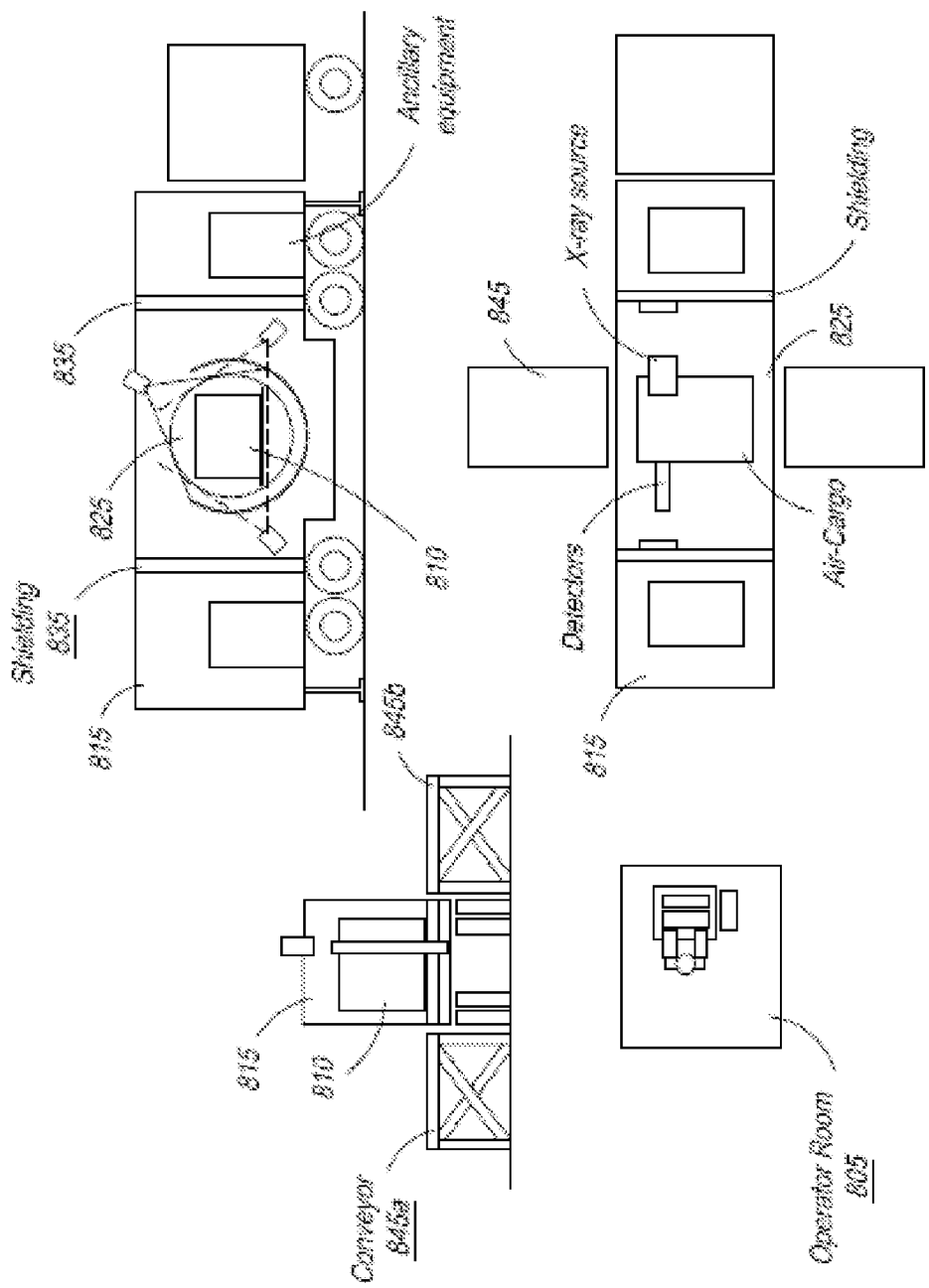
FIG. 8 illustrates an exemplary mobile deployment of the CT system of the present invention.

As shown in FIG. 8, the various embodiments of the present invention described above can be implemented in a mobile configuration to allow for fast deployment. An X-ray system 825, such as that described above in the present specification, is positioned within a mobile trailer, vehicle, truck, container, or other carrier 815. Shielding 835 within carrier 815 constrains radiation leakage external to the scanning area. An operator room 805 is positioned separate and apart from mobile carrier 815 and contains all of the controls required to start, stop, or otherwise control the operation of X-ray system 825 and a conveyor system 845.

Carrier 815 has openings on the sides through which an object 810 can be conveyed using conveyor system 845, which comprises two external conveyors and an internal conveyor. An entrance 845*a* and an exit 845*b*, along with the conveyors translate object 810 through X-ray system 825. In one embodiment, operator room 805 and the external conveyors are located in carrier 815 for easy redeployment. In another configuration, the carrier ceiling may have openings to allow for source positioning or motion. During driving, the source is maintained inside the truck.

Figure 9:
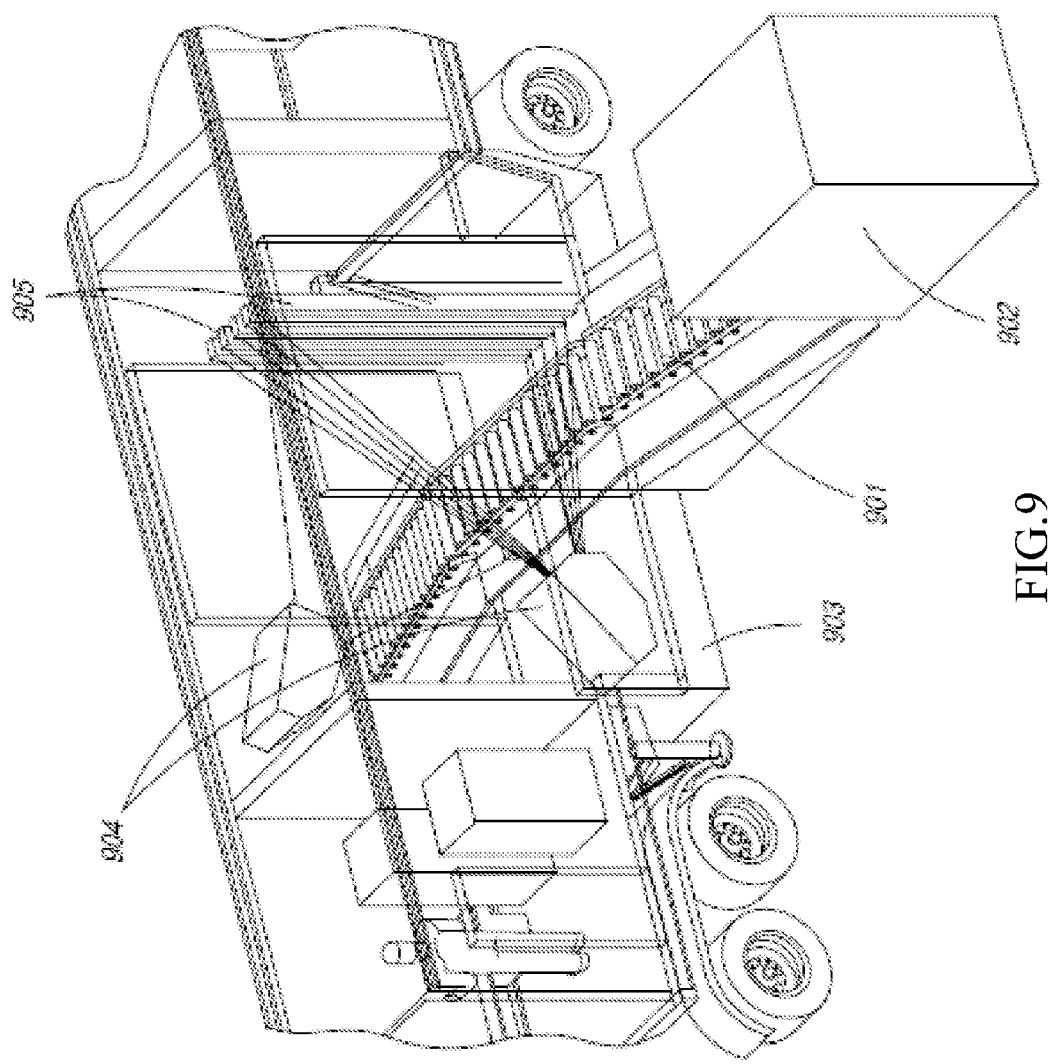
FIG. 9 illustrates one embodiment of the mobile inspection system that uses a conveyer with a scanner with multiple views.

FIG. 9 illustrates the mobile inspection system as described above, showing a conveyer system 901 which allows a cargo container 902 to move from one side of a mobile trailer 903 to another. Cargo containers are scanned inside trailer 903 using the X-ray system, which further comprises X-ray sources 904 and detector arrays 905.

FIG. 10 illustrates another embodiment of the mobile inspection system, wherein the conveyer is replaced by a ramp 1001, which allows cargo 1002 to be driven through a mobile trailer 1003 for scanning.

The above examples are merely illustrative of the many applications of the system of present invention. In other embodiments, the electron linac may be replaced, with a particle accelerator (e.g. deuterons) and the X-ray production targets with neutron production targets (e.g. deuterium gas) to produce neutrons. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. An inspection system for generating a plurality of scanning views of an object under inspection, comprising:
    a source for generating at least one high-energy electron beam;
    a first set of magnets for directing the at least one electron beams into an electron beam transport system;
    the electron beam transport system comprising at least two electron beam transport stations, for directing said at least one electron beam to more than one target, wherein said more than one target produces radiation beams for scanning the object;
    at least one second set of magnets to maintain the at least one electron beam in a desired trajectory;
    at least one detector array for detecting said radiation and generating said plurality of scanning views;
    a transport mechanism to move the object through the system; and
    a processor for reconstructing tomographic images by combining said plurality of scanning views.

2. The inspection system of claim 1, wherein the source is a linac.

3. The inspection system of claim 1, wherein two high energy electron beams are generated in an interlaced mode, wherein the energy of a first energy electron beam is lower than the energy of a second electron beam.

4. The inspection system of claim 1 wherein the electron source is pulsed with a pulsing frequency is 500 Hz.

5. The inspection system of claim 1, wherein the first set of magnets is used in combination with slits to filter out low energy electron components.

6. The inspection system of claim 3, wherein the first set of magnets comprises two magnets for turning the interlaced beams at different angles such that they end up on the same trajectory.

7. The inspection system of claim 1 wherein each of said at least two electron beam transport stations comprises, each station comprising:
    a first pulsed magnet to extract electrons from the beam and a second pulsed magnet for bringing electrons having different energies from the first magnet onto a same path, wherein a sum of the angles of the magnets is approximately 270 degrees and wherein the first pulsed magnet is roughly 90 degrees and the second pulsed magnet is roughly 180 degrees; and
    two quadrupoles to focus the beam on one of said more than one target in both directions to achieved a desired focal-spot size.

8. The inspection system of claim 7, wherein the electron transport station comprises a steering magnet for steering an electron beam into multiple positions on one of said more than one target.

9. The inspection system of claim 1, wherein the second set of magnets comprise an achromat that includes two dipoles and one quadrupole.

10. The inspection system of claim 3 wherein the processor for reconstructing tomographic images uses data generated from the two interlaced high energy electron beams to create tomographic images to obtain atomic number information.

11. An inspection system for generating a plurality of scanning views of an object under inspection, comprising:
    a source for generating a high-energy electron beam;
    a first magnet for directing the high energy electron beam into an electron beam transport system to a corresponding at least one production target for generating radiation beams for scanning the object;
    said electron beam transport system comprising at least two electron beam transport stations, wherein each of said at least two electron beam transport stations comprises
        a first dipole magnet to extract electrons from the high-energy beam and a second dipole magnet for bringing electrons having different energies from the first magnet onto the same trajectory, wherein a sum of the angles of the magnets is approximately 90 degrees and wherein the first dipole magnet is roughly 45 degrees and the second dipole magnet is roughly 45 degrees;
        a quadrupole magnet placed symmetrically between the first and second dipole magnets; and
        two quadrupoles to focus the high-energy beam on the target in orthogonal directions to achieved a desired focal-spot size; and
    at least one detector array for detecting said radiation beams to produce said plurality of scanning views;
    a transport mechanism to move the object through the system; and
    a processor for reconstructing tomographic images by combining said plurality of scanning views.

12. The inspection system of claim 11 wherein said at least one production target is at least one of an extended target or a separate target for each electron beam transport station.

13. The inspection system of claim 11 wherein a second high energy radiation beam is generated after a first scan process by changing magnetic parameters of the system to transport a second high energy beam having a different energy than the first high energy beam.

14. The inspection system of claim 13 wherein the object is scanned at the first energy and then rescanned at the second energy and wherein data generated from both scans is combined to obtain atomic number information.

15. The inspection system of claim 11, wherein the first magnet is used in combination with slits to filter out low energy electron components.

16. An inspection system for generating a plurality of scanning views of an object under inspection, comprising:
    a source for generating at least one beam of charged particles;
    a beam steering system comprising at least two electron beam transport stations, each of said stations directing said charged particles to a plurality of locations along at least one target, said at least one target generating a plurality of neutron beams for scanning the object;

at least one neutron detector array for detecting said neutron beams and generating said plurality of scanning views;

a transport mechanism to move the object through the system; and a processor for reconstructing tomographic images by combining said plurality of scanning views obtained from the at least one neutron detector array.

17. The system of claim 16 wherein said particle is a low-energy deuteron (300 kV or lower).

18. The system of claim 17 the at least one target is tritium-based.

19. The system of claim 16 wherein said particle is high-energy deuteron (at least 3 MV).

20. The system of claim 19 wherein said at least one target is deuterium- or beryllium-based.

21. The system of claim 16 wherein said particle is a proton.

22. The system of claim 21 wherein said at least one target is lithium.

23. The system of claim 16 wherein the at least one target is positioned along an arcuate path.

\* \* \* \* \*